(12) United States Patent
Gurvitch et al.

(10) Patent No.: US 8,158,941 B2
(45) Date of Patent: Apr. 17, 2012

(54) BOLOMETRIC SENSOR WITH HIGH TCR AND TUNABLE LOW RESISTIVITY

(75) Inventors: Michael A. Gurvitch, Stony Brook, NY (US); Serge Luryi, Old Field, NY (US); Aleksandr Y. Polyakov, Brooklyn, NY (US); Aleksandr Shabalov, Centereach, NY (US)

(73) Assignee: Research Foundation of State University of New York, Albany, NY (US)

( * ) Notice: Subject to any disclaimer, the term of this patent is extended or adjusted under 35 U.S.C. 154(b) by 0 days.

(21) Appl. No.: 12/924,930

(22) Filed: Oct. 8, 2010

(65) Prior Publication Data
US 2011/0248167 A1  Oct. 13, 2011

Related U.S. Application Data

(63) Continuation of application No. PCT/US2009/002484, filed on Apr. 21, 2009.

(51) Int. Cl.
*G01J 5/00* (2006.01)
(52) U.S. Cl. .................. 250/338.1; 250/339.04
(58) Field of Classification Search .......... 250/330, 250/332, 338.1, 338.3, 338.4, 339.02, 339.03, 250/339.04, 340
See application file for complete search history.

(56) References Cited

U.S. PATENT DOCUMENTS

| 6,323,486 B1 * | 11/2001 | Grossman et al. ......... 250/338.1 |
| 6,346,703 B1 | 2/2002 | Lee et al. |
| 2003/0168599 A1 | 9/2003 | Liddiard |
| 2005/0258367 A1 * | 11/2005 | Anderson et al. ......... 250/338.1 |
| 2007/0029484 A1 | 2/2007 | Anderson et al. |
| 2008/0237467 A1 | 10/2008 | Oda et al. |

OTHER PUBLICATIONS

V. Yu. Zerov, et al. Features of the operation of a bolometer based on a vanadium dioxide film in a temperature interval that includes a phase transition.J. Opt. Technol. 66 (5) May 1999 pp. 387-390.
B.E. Cole, et al. Monolithic Two-Dimensional Arrays of Micromachined Microstructures for Infrared Applications. Proceedings of the IEEE, vol. 86, No. 8, Aug. 1998, pp. 1679-1686.
B.E. Cole, et al. Monolithic Arrays of Micromachined Pixels for Infrared Applications. 1998 IEEE IEDM 98, pp. 459-462.
Hubert Jerominek, et al. Vanadium oxide films for optical switching and detection. 2092/Optical Engineering /Sep. 1993/vol. 32 No. 9.

(Continued)

*Primary Examiner* — Mark R Gaworecki
(74) *Attorney, Agent, or Firm* — Lawrence G. Fridman

(57) ABSTRACT

The present invention provides a novel way of operating sensing elements or bolometers in the resistive hysteresis region of a phase-transitioning $VO_2$ (or doped $VO_2$) films. The invention is based on a novel principle that minor hysteresis loops inside the major loop become single-valued or non-hysteretic for sufficiently small temperature excursions. This single valued R(T) branches being characterized by essentially the same temperature coefficient of resistivity (TCR) as the semiconducting phase at room temperature. These non-hysteretic branches (NHB) can be located close to the metallic-phase end of the major loop, thus providing for tunable resistivity orders of magnitude lower than that of a pure semiconducting phase. Operating the Focal Plan Array in one of these NHBs allows for having high TCR and low resistivity simultaneously. Means for measuring of the sensor R(T) characteristic is provided together with the means of achieving and controlling the correct sensor positioning at the operating temperature inside one of these NHBs.

18 Claims, 13 Drawing Sheets

OTHER PUBLICATIONS

Luiz Alberto Luz de Almeida et al. Modeling of the hysteretic metal-insulator transition in a vanadium dioxide infrared detector. Optical Engineering vol. 41 No. 10, Oct. 2002, pp. 2582-2588.

L.A. L. de Almeida, et al. Modeling and performance of vanadium-oxide transitiion edge microbolometers. Applied Physics Letters vol. 85, No. 16, Oct. 18, 2004. Downloaded Apr. 25, 2007 to 129.49.69.128.

F.J. Morin, Oxides which show a metal-to-insulator transition at the neel temperature. Physical Review Letters vol. 3, No. 1, Jul. 1, 1959.

V, Yu Zerov, et al. Heat-sensitive maerials for uncooled microbolometer arrays. J. Opt. Technol 68 (12), Dec. 2001, pp. 939-948.

M. Gurvitch, et al. Nonhysteretic behavior inside the hysteresis loop of VO2 and its possible application in infrared imaging 2009 American Instiue of Physics 106, 104504.

M. Gurvitch, et al. VO2 films with strong semiconductor to metal phase transition prepared by the precursor oxidation 2007 American Institute of Physics—Jrnl of Applied Physics 102,033504 (2007).

T.G. Lanskaya, et al. Hysteresis effects at the semiconductor-metal phase transition in vanadium oxides.Sov. Phys: Solid State 20 (2), Feb. 1978, pp. 193-197.

Antoni Rogalski. Infrared detectors: status and trends. Progress in Quantum Electronics 27 (2003) 59-210.*

PCT/US 09/02484 The International Search Report and the Written Opinion, Dated Dec. 2, 2010.

W.Radford, et al 320 x 240 Silicon Microbolometer uncooled IRFPAs w/ on-chip offset correction 82/SPIEVol. 2746 (1996).

Robert J. Herring & Philip E. Howard—Design and Performance of the ULTRA 320 x 240 uncooled focal plane array and sensor. 2/SPIE vol. 2746 pp. 2-12 (1996).

Paul W. Kruse—Can the 300K radiating background noise limit be attained by uncooled thermal imagers? SPIE vol. 5406 pp. 437-446 (2004).

V. Yu. Zerov, et al. Features of the operation of a bolometer based on a vanadium dioxide film in a temperature interval that includes a phase transition. J. Opt. Technol. 66 (5) May 1999 pp. 387-390.

B.E. Cole, et al. Monolithic Two-Dimensional Arrays of Micromachined Microstructures for Infrared Applications. Proceedings of the IEEE, vol. 86, No. 8, Aug. 1998, pp. 1679-1686.

B.E. Cole, et al. Monolithic Arrays of Micromachined Pixels for Infrared Appl. 1998 IEEE IEDM 98, pp. 459-462 (1998).

Hubert Jerotninek, et al. Vanadium oxide films for optical switching and detection. 2092/Optical Engineering /Sep. 1993/vol. 32 No. 9. (1993).

Luiz Alberto Luz de Almeida et al. Modeling of the hysteretic metal-insulator transition in a vanadium dioxide infrared detector. Optical Engineering vol. 41 No. 10, Oct. 2002, pp. 2582-2588 (2002).

V. Yu. Zerov, et al. Vanadium Oxide Films with Improved Characteristics for IR Microbolometric Matrices.Technical Physical Letters vol. 27 No. 5 1001 pp. 378-380 (2001).

L.A. L. de Almeida, et al. Modeling and performance of vanadium-oxide transitiion edge microbolometers. Applied Physics Letters vol. 85, No. 16, Oct. 18, 2004. Downloaded Apr. 25, 2007 to 129.49.69.128 (2004).

F.J. Morin, Oxides which show a metal-to-insulator transition at the neel temperature. Physical Review Letters vol. 3, No. 1, Jul. 1, 1959.

V, Yu Zerov, et al. Heat-sensitive maerials for uncooled microbolometer arrays. J. Opt. Technol 68 (12), Dec. 2001, pp. 939-948.

M. Gurvitch, et al. Nonhysteretic behavior inside the hysteresis loop of VO2 and its possible application in infrared imagin 2009 American Instiue of Physics 106, 104504 (2009).

M. Gurvitch, et al. VO2 films with strong semiconductor to metal phase transition prepared by the precursor oxidation 2007 American Institute of Physics—Jrnl of Applied Physics 102.033504 (2007).

M. Gurvitch, et al. Nonhysteretic Phenomena in the Metal-Semiconductor Phase-Transition Loop of VO2 Films for Bolometric Sensor Applications. TNANO-00364-2009. R1, pp. 1-6 (2009).

T.C. Lanskaya, et al. Hysteresis effects at the semiconductor-metal phase transition in vanadium oxides. Sov. Phys. Solid State 20 (2), Feb. 1978, pp. 193-197.

-Antoni Rogalski. Infrared detectors: status and trends. Progress in Quantum Electronics (2003) 27 59-210 (2003).

* cited by examiner

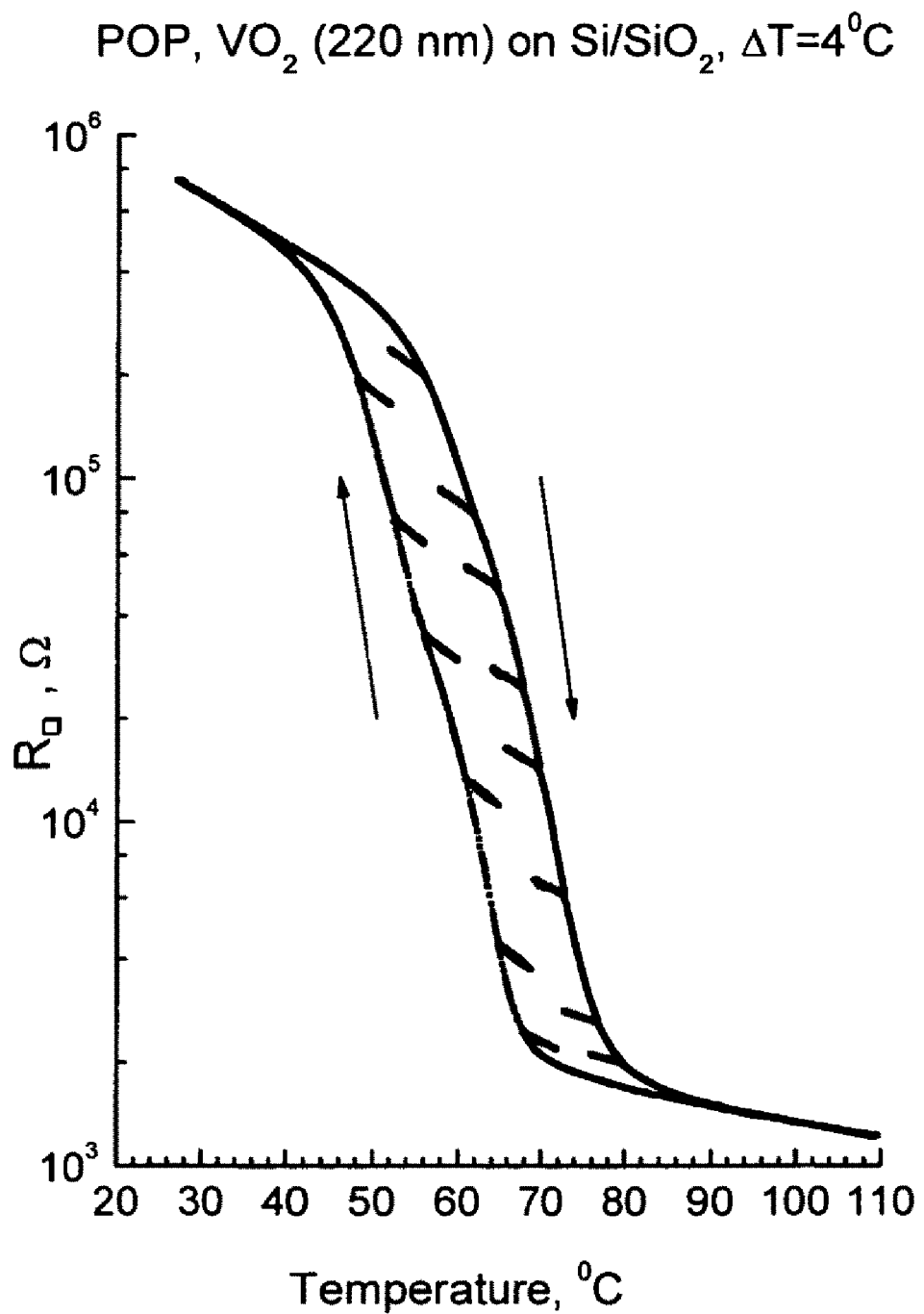
F I G. 2A

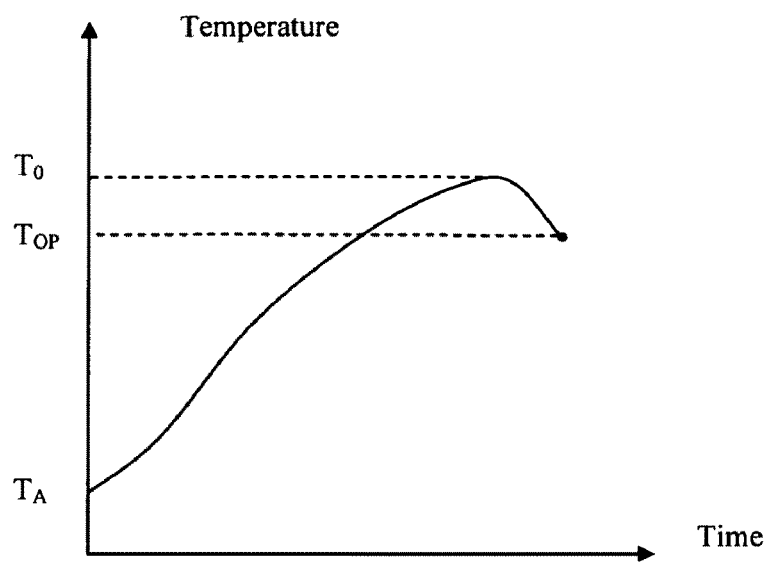
F I G. 8A
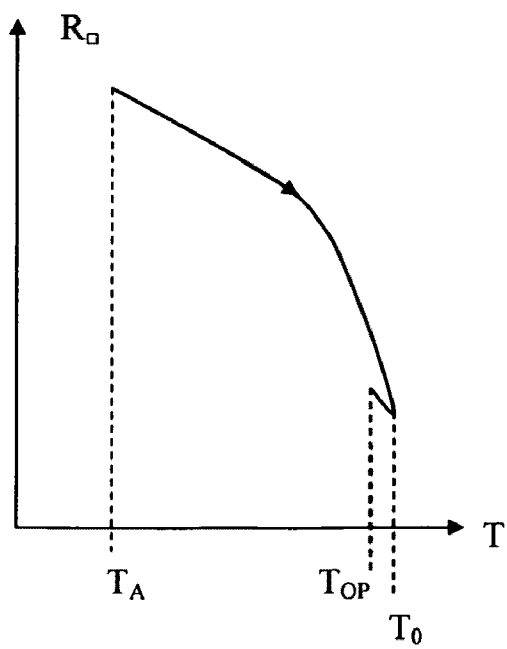
F I G. 8B

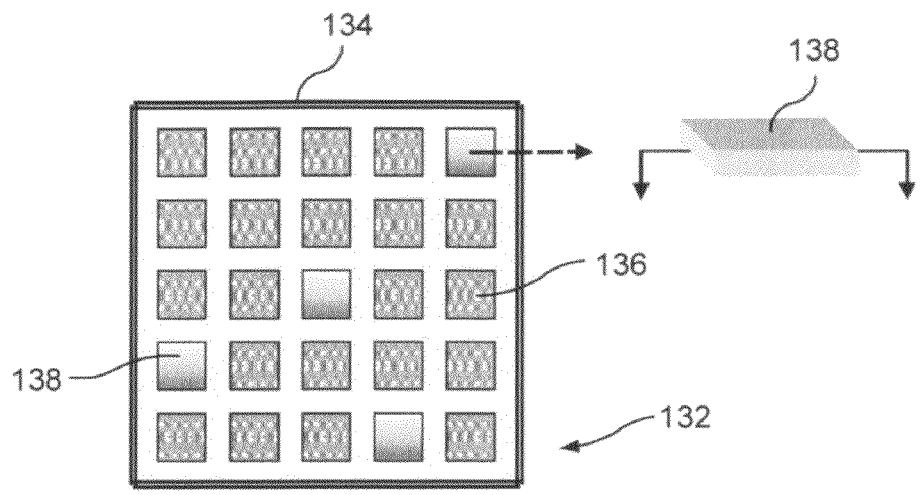
F I G. 10A
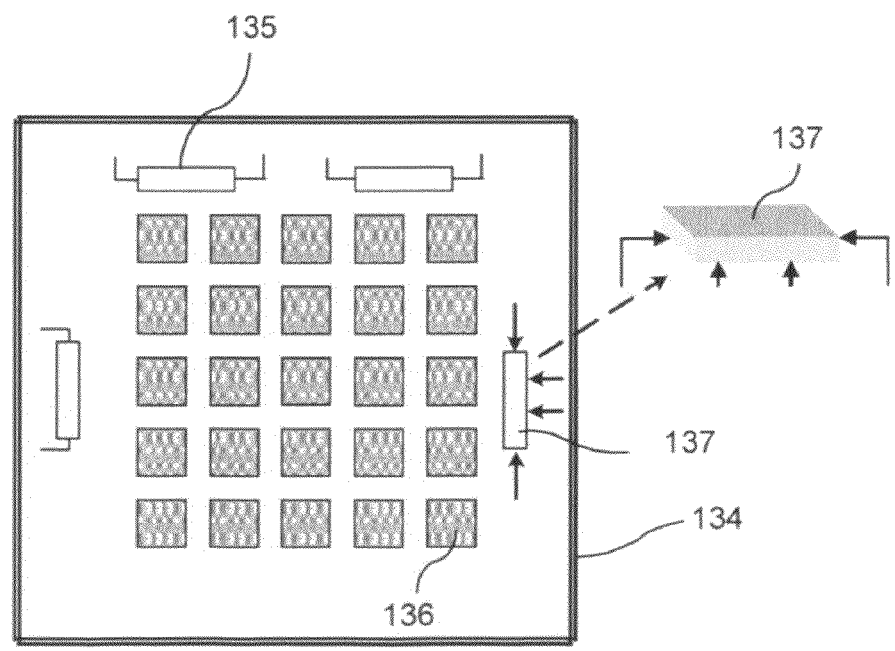
F I G. 10B

| Major loop branch | $T_0$, C | $T_{OP}$, C | $T_{OP}$, K | $C(T)$, K×Ω$^{1/2}$ | $R_\square$, KΩ measured | $R_\square$, KΩ (for d=50 nm) | TCR, K$^{-1}$ | SNR calculated for a 50 nm pixel |
|---|---|---|---|---|---|---|---|---|
| – | – | 25 | 298 | 4.63×10$^6$ | 795 | 3,498 | 0.0352 | 87 |
| HB | 61.5 | 59.8 | 332.9 | 4.38×10$^6$ | 138.6 | 610 | 0.0421 | 236 |
| HB | 70.0 | 68 | 341.1 | 4.33×10$^6$ | 15.45 | 68 | 0.0334 | 555 |
| CB | 52.4 | 54.2 | 327.3 | 4.42×10$^6$ | 70.0 | 308 | 0.0474 | 378 |
| CB | 64.7 | 66.7 | 339.8 | 4.34×10$^6$ | 4.045 | 17.8 | 0.0437 | 1422 |
| CB | 68.1 | 70.2 | 343.3 | 4.31×10$^6$ | 2.27 | 10.0 | 0.0282 | 1215 |

FIG. 12

BOLOMETRIC SENSOR WITH HIGH TCR AND TUNABLE LOW RESISTIVITY

This application is a continuation of PCT/US2009/002484 filed Apr. 21, 2009 claiming priority of U.S. Provisional Application No. 61/125,080 filed Apr. 21, 2008.

FIELD OF THE INVENTION

The invention relates to the field of infrared (IR) imaging technology, and specifically it relates to the Focal Plane Array (FPA) technology based on resistive readout of individual semiconducting microbolometers (sensors).

BACKGROUND OF THE INVENTION

Visualization of IR radiation in the atmospheric IR window of 8-12 μm (and in principle in a wider spectral range) is achieved in the technology by projecting an IR picture onto a sufficiently large (up to hundreds of thousands of pixels) 2D matrix (array) of small square sensing microbolometers, typically from 25×25 μm$^2$ to 50×50 μm$^2$ each, this array being placed in the focal plane of IR optics projecting the picture. For a fixed period of time referred to as the frame (typically in the 1-30 ms range) an IR picture is projected onto an array, exposing it to spatially non-uniform intensity of IR radiation. Each pixel integrates the IR radiant energy it receives and, provided it is thermally isolated from a heat-sunk substrate, reacts to the energy influx by raising its temperature. In the prior art thermal isolation is achieved by placing individual sensing pixels onto silicon nitride membranes (micro bridges) suspended above a substrate, and by evacuating the package to eliminate heat conduction through air. Provided that sensor resistivity is temperature-dependent, a change in pixel's temperature in turn produces a change in its electrical resistance. The two electrical leads applied to each sensing element provide for reading out the change in said element's electrical resistance. For example, in one implementation, this change in resistance is producing a current change at a constant-voltage pulsed bias applied for 70 μs to each microbolometer, thus providing a means of transforming an IR picture into a collection of electrical signals from the pixels. These electrical signals in turn can be visually displayed, thus reproducing the pixilated image of the original IR picture in the visible domain.

One of the issues resolved by the Invention relates to the sensor material and its electrical resistance as a function of temperature. The material of choice in the modern commercially available (focal plane array) FPA technology is a thin film (typically 50 nm) of vanadium oxide VO$_x$. While VO$_x$ contains mostly VO$_2$, it is not a pure-phase vanadium dioxide. Initially in the uncooled infrared imaging technology there were proposals to operate the uncooled (even heated) bolometer as a transition-edge device using the strong semiconductor-to-metal phase transition (SMT), such as found in VO$_2$ at 68 C in single crystals and between 50 C and 90 C in typical polycrystalline films. SMT-based device was proposed as a high-temperature substitute for a superconducting transition-edge bolometer operating at low temperatures. Resistivity ρ changes by a factor of ~10$^3$-10$^4$ in SMT in VO$_2$ films, providing high temperature coefficient of resistivity TCR=(1/ρ) dρ/dT and thus holding a promise of high bolometer responsivity.

Although this attractive idea continues to reappear in the prior art, the modern practical implementation of the uncooled focal plane array (UFPA) infrared imaging technology is based on resistive readout of individual VO$_x$ microbolometers operating at or around room temperature, away from the SMT in VO$_2$. Usually the non-stoichiometric VO$_x$ films used in this technology do not posses SMT at all. The reason for abandoning the very high TCR found in the transition region is that, it is accompanied by other undesirable features, such as hysteresis for example. There is also latent heat released/absorbed in the transition, which is feared to interfere with bolometer operation. Also the fact that transition takes place at elevated temperatures requires heating of the bolometer above the room temperature. There are also reasons to suspect that VO$_2$ in the hysteretic transition region will exhibit an excess flicker 1/f noise resulting from electrons transitioning by tunneling or activated hopping between conductive (M) microdomains separated by semiconducting (S) microdomains. Indeed, it is known that mixtures of conductive and insulating domains are prone to such noise, which has been found, for example, in polymers filled with metallic particles. This excess noise in the transition region of VO$_2$, has not been properly measured, but assumed to be there based on the physical picture of fluctuating M and S microdomains co-existing in the hysteretic region.

In view of the above, initial attempts to use the phase-transition were abandoned. Mixed vanadium oxide VO$_x$ with x≈2 was found to posses an attractive combination of reasonably high TCR=(1/ρ)dρ/dT and low R$_\square$=ρ/d at 25 C in the semiconducting phase [here ρ is resistivity, d film thickness, R$_\square$ is the resistance of a square (pixel)], as well as moderately low 1/f noise. Thus, vanadium oxide was considered a suitable semiconductor sensor material despite a decision to abandon its phase transition capability. The mixed oxide VO$_x$ used at ~25 C in commercial UFPA bolometers may not even exhibit a phase transition at higher temperatures.

VO$_x$ is manufactured to provide TCR~(−2%). In the prior art parameter of VO$_x$ sensor material R$_\square$ varies in the wide range, from 10 kΩ to 200 kΩ at 25 C. However, R$_\square$=10-20 kΩ is the preferred range in FPA applications, with higher R$_\square$ causing problems in readout and in terms of noise. With this limitation on R$_\square$, the use of high crystalline quality pure phase VO$_2$, which would have higher TCR, is problematic: VO$_2$ single crystals and epitaxial films have ρ(25 C) in the range 0.1 Ωm to 1.0 Ωm. This implies R$_\square$=2-20 MΩ for a 50 nm film thickness typically used in FPA sensors. These R$_\square$ values are 100-200 times higher than required. In the work of the inventors it was found that the room-temperature values of R$_\square$ for 50 nm pure-phase VO$_2$ films were from about 1.5 MΩ to about 4.2 MΩ, while TCR varied from −2.5% to −5%. Despite an attractive TCR, the high R$_\square$ values should make these films unsuitable for the resistive-readout IR imaging application at or around 25 C.

An important issue discussed in the application is why high R$_\square$ is detrimental?

First, one needs to match the pixel resistance to the electronic readout circuit which is amplifying the small resistance change associated with the IR signal. This matching is apparently becoming more difficult at high R$_\square$.

A second reason why high R$_\square$ is detrimental to the FPA performance is the increase in Johnson's noise. Johnson's noise has been sited as the major contributor to overall noise even at R$_\square$=20 kΩ. Johnson's noise is one ingredient in more practical consideration of signal to noise ratio (SNR) in the device of the invention. Let us consider R$_\square$-dependence of signal to noise ratio in the prevailing measuring scheme, in which all pixels (sensors) are biased by the same constant voltage V$_0$, and the change in each pixel's resistance ΔR$_\square$ is producing a change in individual pixel's current ΔI, the latter representing the useful signal.

By Ohm's law $I=V_0/R_\square$ and, at constant $V_0$, $|\Delta I|=(V_0/R_\square^2)\Delta R_\square$. At the same time Johnson noise manifests itself as fluctuations in $V_0$, with the rms average of these voltage fluctuations $\delta V_0$ being proportionate to $R_\square^{1/2}$, according to $\delta V_0=(4kT\Delta f\, R_\square)^{1/2}$, where k is Boltzmann's constant, T absolute temperature, $\Delta f$ measurement bandwidth. Therefore current noise will be equal to $\delta I=\delta V_0/R_\square=(4kT\Delta f/R_\square)^{1/2}$. The signal-to-noise ratio for the current $S/N=|\Delta I|/\delta I=[V_0\Delta R_\square/(4kT\Delta f)^{1/2}]/R_\square^{3/2}$, and further replacing $\Delta R_\square/R_\square$ with $\Delta T(TCR)$, we find $$S/N=|\Delta I|/\delta I=[V_0\Delta T(TCR)/(4kT\Delta f)^{1/2}]/R_\square^{1/2} \qquad (1)$$

As could be expected, in this voltage-bias measuring scheme, the SNR for the current is proportional to the voltage pulse amplitude, to the pixel's temperature change $\Delta T$ and to the TCR. However, this analysis also shows that it is proportional to $R_\square^{-1/2}$, indicating that higher $R_\square$ corresponds to significantly lower SNR. For example, a factor of 100 higher $R_\square$ corresponds to 10 times lower SNR. Note that if SNR were defined as the ratio of corresponding powers, formula (1) would have to be squared, and in our example SNR power would be 100 times smaller.

The third reason for rejecting the high resistance pixels is: increased current (Joule) heating during readout.

One can not effectively resolve the difficulty of exceedingly high pixel resistance by making the sensing layers thicker, and thus reducing $R_\square$. One can not make them 100 thicker for technological reasons; While making films which are 2-3 times thicker is technologically feasible, any increase in sensor thickness is undesirable as it increases the bolometer thermal mass and thus reduces responsivity. In this sense, an increase in thickness is equivalent to a reduction in TCR.

Clearly, in a semiconductor, the requirements of high TCR and low $\rho$ (or $R_\square$) are directly conflicting with each other, making high TCR pure phase $VO_2$ films unusable in FPA application due to their high resistivity.

If it were not for the large resistance, pure phase $VO_2$ would be preferred over $VO_x$ in the near room temperature operation. This is because of higher bolometer TCR of 2.5-5% vs. 2% and because a well-defined single phase sensor material should provide for an easier process control compared to a need to reproduce and make uniform layers of a mixed, ill-defined, ill-behaved $VO_x$. Furthermore, a pure phase sensor material with fewer defects should have a lower 1/f noise.

The present invention is based on inventor's discovery of a new phenomenon which takes place in pure phase $VO_2$ and offers the possibility of preserving the high TCR, while avoiding hysteresis and dramatically, by orders of magnitude, lowering $R_\square$. Moreover, the explanations of such new phenomenon indicate that its use circumvents many other difficulties associated with the phase transition, namely, the emission/absorption of latent heat and excess noise.

SUMMARY OF THE INVENTION

In the resistive phase transition in $VO_2$, temperature excursions taken from points on the major hysteresis loop produce minor loops. It has been found that for sufficiently small excursions these minor loops degenerate into single-valued, non-hysteretic branches (NHBs) linear in $\log(\rho)$ vs. T and having essentially the same or even higher temperature coefficient of resistance (TCR) as the semiconducting phase at room temperature. This behavior can be understood based on the microscopic picture of percolating phases. Similar short non-hysteretic branches are found in otherwise hysteretic optical reflectivity. The opportunities NHBs present for infrared imaging technology based on resistive microbolometers are considered. It is possible to choose a NHB with $10^2$-$10^3$ times smaller resistivity than in a pure semiconducting phase, thus providing a microbolometer (sensor) with low tunable resistivity and high TCR. Noise measurements performed from 1 Hz to 20 kHz in a semiconducting phase below the transition and on various NHBs inside the hysteresis loop confirm absence of significant detrimental excess noise in the new regime of bolometer operation.

One aspect of the invention teaches using $VO_2$ operating in one of the NHBs chosen so as to simultaneously benefit from relatively high TCR and low $R_\square$, this value of $R_\square$ being tunable within a fairly wide range. It provides for means of positioning the sensor (or a collection of sensors) at the desirable operating temperature. These means include capability of temperature control over the whole temperature range of the major hysteresis loop, and means of measuring R(T) over that range. It also teaches about the limitations of the dynamic range of device operation, providing for the best performance of the device.

As to another aspect of the invention, TCR in $VO_2$ is higher than in $VO_x$, benefiting bolometer responsivity. Low tunable $R_\square$ provides for matching with an electronic circuit reading out small changes in sensor resistance, for low readout noise and for absence of microbolometer heating during resistive readout. In the invention, a Johnson noise lower than in an existing technology is possible, provided NHB is chosen with $R_\square<20$ k$\Omega$.

As to a further aspect of the invention, TCRs in NHBs are generally higher than at room temperature, which is further benefiting bolometric responsivity.

As to still another aspect of the present invention, the sensor material is well defined in terms of its stoichiometry (ratio of V to O in the formula), and in terms of its crystallographic phase (preferably pure-phase $VO_2$). A well-defined single phase sensing material will allow for an easier process control as compared to a need to reproduce and make uniform layers of a mixed, ill-defined oxide $VO_x$ in the present art.

As to still a further aspect of the present invention, utilization of well-defined, reproducible, phase-transitioning doped $VO_2$, which could have a lower operating temperature and higher TCR than undoped $VO_2$ is not precluded. The deposition process for the said pure-phase $VO_2$ is compatible with the normal bolometer fabrication process: in the inventor's work, good quality $VO_2$ was deposited by the Precursor Oxidation Process (POP) at below 400 C. A better (fewer defects) sensor material will have a lower 1/f noise.

According to an essential aspect of the present invention, it is offered relative insensitivity to imperfections in pixel uniformity as well as to variations in the operating temperature across an array: both are expected to be well tolerated given that neighboring NHBs have essentially the same TCR, and that NHBs are linear in log R vs. T. This simplifies temperature control requirements in FPA technology.

According to another essential aspect of the invention, given the nearly-frozen (transitionless in a sense of not forming new topological connections) domain structure within an NHB, the material does not experience as many microdomain phase transitions within its dynamic range of operation $\Delta T^*$. Even though it is a mixture of S- and M-phase domains, within a NHB it is expected to behave essentially as a single phase material, without extra noise. This will at least partially remove noise problems sited in the past when using $VO_2$ in the region of its hysteretic phase transition.

In a manner similar to the above, the release and absorption of the latent heat of the first order phase transition which was mentioned in the prior art as one of the reasons for why the phase transition region in VO$_2$ was abandoned, is expected to be minimized within the sluggishly-changing domain structure in the NHB. The limited dynamic range ΔT* of a few degrees is not a problem in the FPA imaging application, where much smaller temperature changes (typically in the mK range) occur as a result of a pixel exposure to an IR picture. It may be also possible to operate the sensor in a regime known in the prior art in which the operating temperature does not change at all, rendering the limited dynamic range irrelevant. In this approach the power delivered to a pixel is adjusted so as to compensate IR induced temperature changes on each pixel, said compensating power being used to provide a useful signal instead of a resistance change.

As to a further essential aspect of the invention, it is noticed that the NHB width ΔT* gets proportionately larger in wider hysteresis films (such as in PLD films as compared to POP films, as well as in PLD films on Si/SiO$_2$ as compared to PLD films on sapphire). This appears to be a natural consequence of larger hysteresis widths in individual domains. The inventors observed NHBs with ΔT* up to 6 C in some samples. It is further noted that ΔT* depends on the placement of a NHB inside a given major loop. These considerations will allow widening of the dynamic range from about 4 C to about 6 C or even higher, should it be necessary.

As to the detailed resistive behavior in the hysteresis region of VO$_2$ films, the invention provides an essential new possibility of preserving the high TCR, while dramatically, orders of magnitude, lowering of the resistivity and thus R$_□$. Moreover, according to the invention, it is possible to choose the desired value of R$_□$ within the wide range of its possible values; R$_□$ becomes tunable. At the same time, it is avoided of having to deal with hysteretic resistivity. The invention also provides means of setting up and maintaining this new regime of operation in VO$_2$ for FPA bolometric IR imaging application.

BRIEF DESCRIPTION OF THE DRAWINGS

FIG. 2A is a chart showing major resistivity loop with a number of minor loops, of POP sample, (similar to that of FIG. 1A) measured with shorter excursions;

FIGS. 8A and 8B are diagrams illustrating a method of positioning a sensor at the desired operating point of the invention;

FIG. 10A illustrates one embodiment of a sensor matrix encapsulated in a thermal enclosure;

FIG. 10B illustrates another embodiment of the sensor matrix encapsulated into the thermal enclosure;

FIG. 12 is a table containing data related to the calculations discussed in the application.

DETAILED DESCRIPTION OF THE INVENTION

It is known from prior art that minor hysteresis loops can be generated inside the major hysteresis loop in the resistivity of VO$_2$ films. These minor loops can be initiated at any attachment temperature T$_0$ on the major loop by making what is referred as a "backward round-trip excursion" from that temperature. For T$_0$ on a heating branch this excursion consists of cooling down and then warming up back to T$_0$, and for T$_0$ on a cooling branch it takes place in reverse order: first warming up and then cooling down. Using mathematical symbols, for T$_0$ on the heating branch (FIB), the backward roundtrip excursion denotes a T$_0$→T$_0$−ΔT→T$_0$ process, i.e. cooling down from T$_0$ to T$_0$−ΔT and then warming up by ΔT back to T$_0$. In this invention, it is assumed that ΔT>0 and will be referred to a positive quantity; ΔT as the excursion length, or simply as an excursion. On the cooling branch (CB) the backward direction is that of warming up, and so the backward roundtrip excursion is T$_0$→T$_0$+ΔT→T$_0$. Excursions in the opposite (forward) direction on either HB or on CB do not produce minor loops. Instead they produce, upon return to the initial temperature, a changed value of a measured quantity (such as resistivity or optical reflectivity), which sometimes is referred to as a "memory" effect.

Figure 1A:
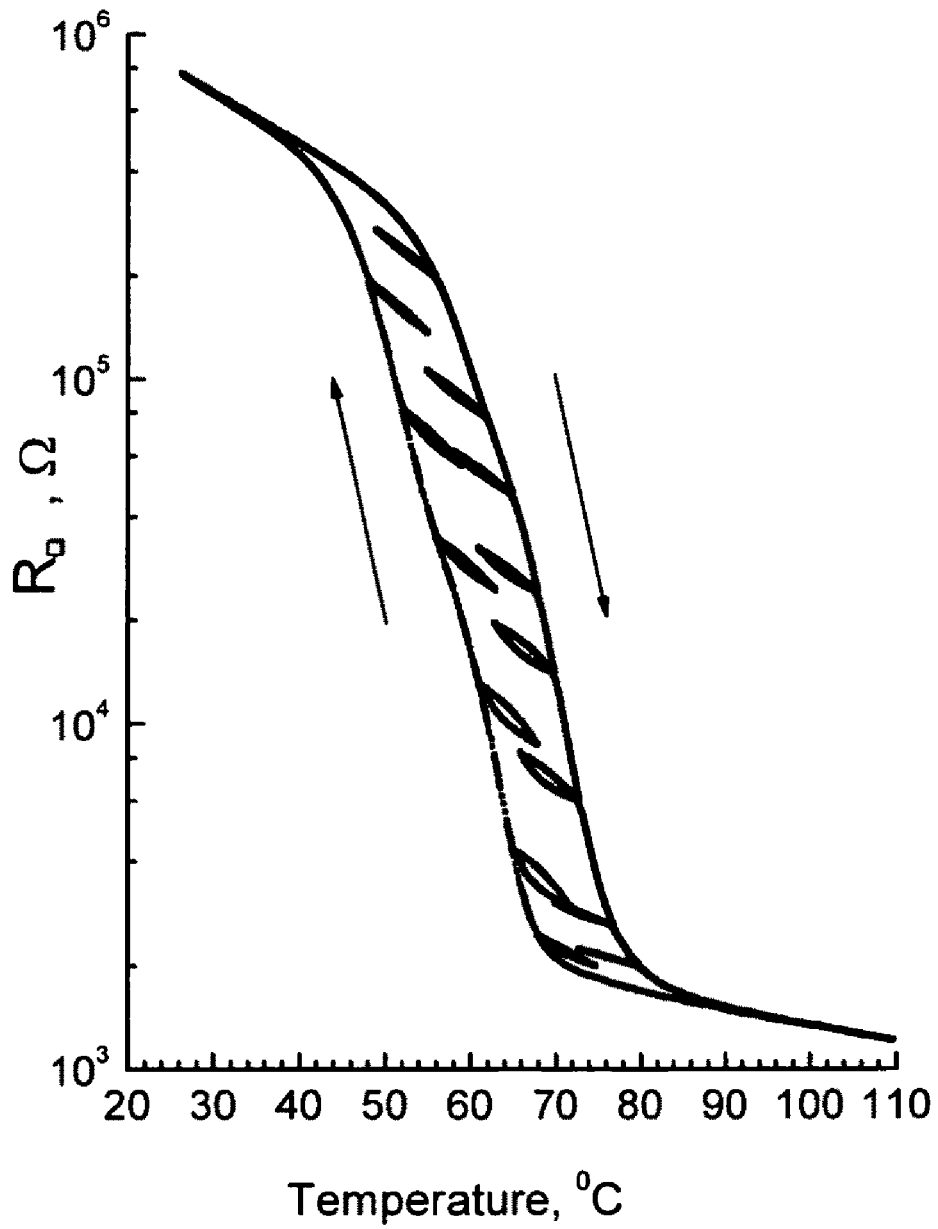
FIG. 1A is a chart showing major resistivity loop of a POP sample, where major loops are shown with a number of minor loops.
Figure 1B:
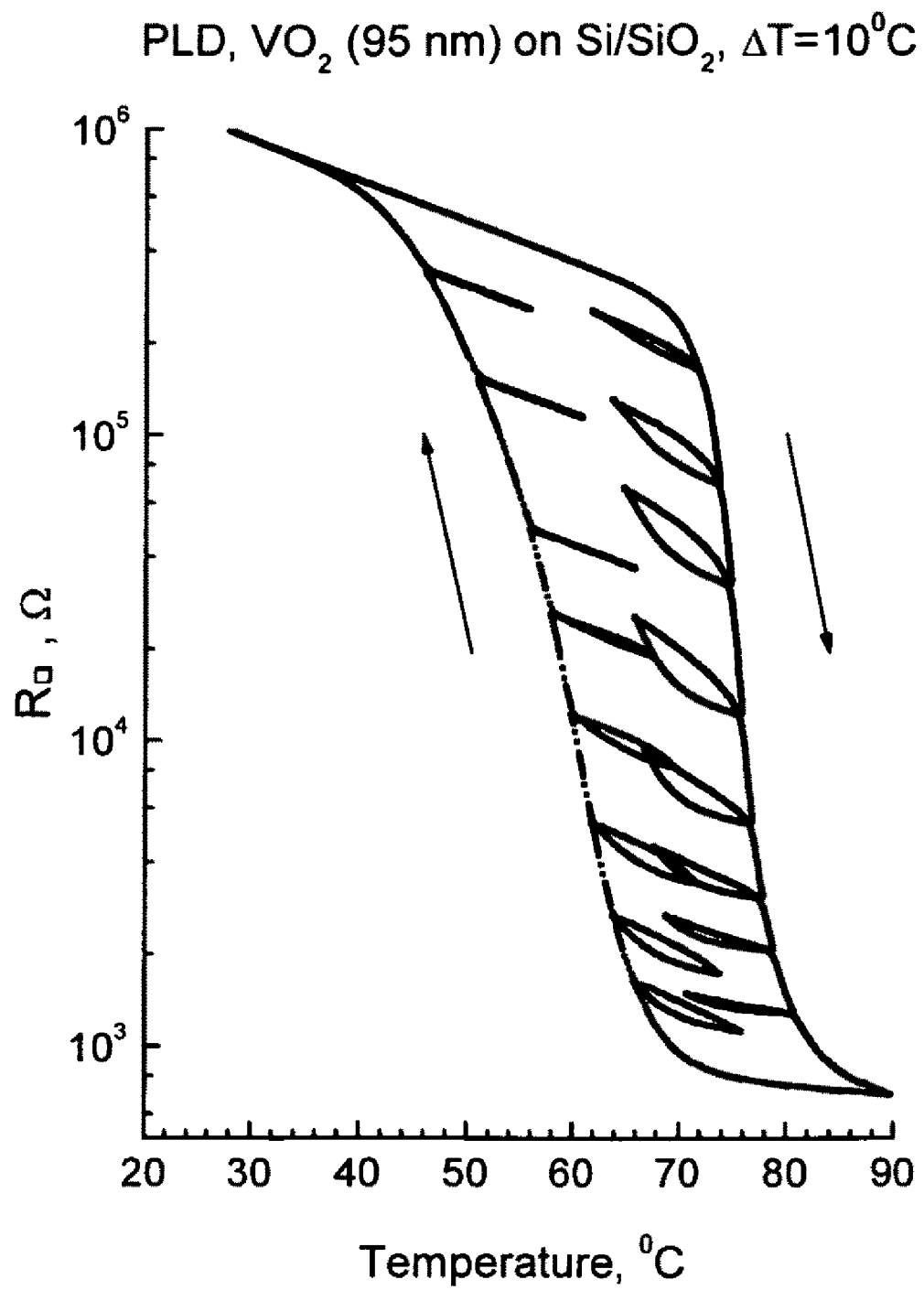
FIG. 1B is a chart showing major resistivity loop of a PLD sample, where major loops are shown with a number of minor loops.
Figure 2B:
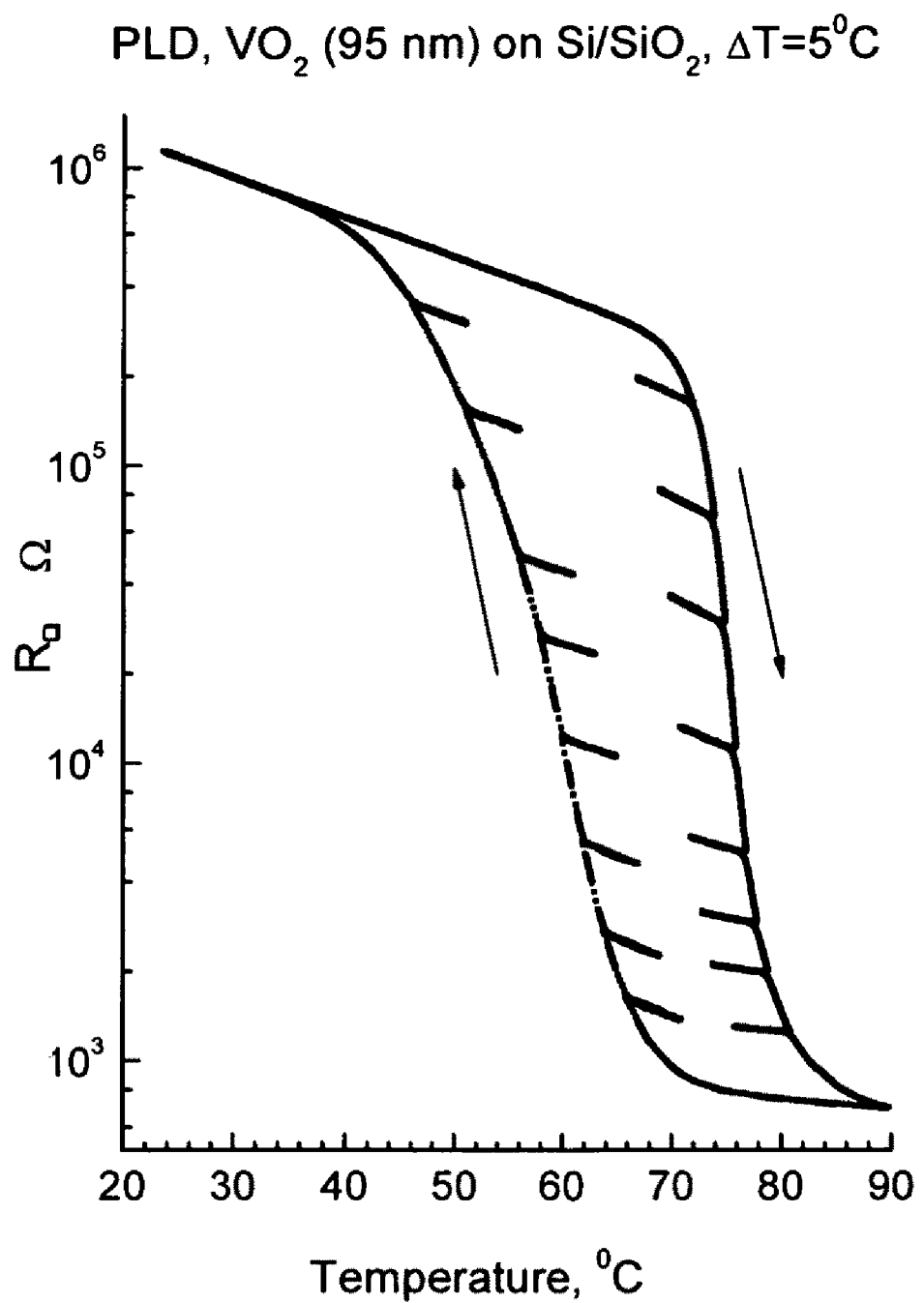
FIG. 2B is a chart showing major resistivity loop with a number of minor loops of PLD sample, (similar to that of FIG. 1B) measured with shorter excursions.

Referring now to FIGS. 1A and 1B, which show major resistivity loops of respectively POP (having thickness d=220 nm) and PLD (having thickness d=95 nm) samples with minor loops attached at regular intervals. In FIGS. 1A and 1B these minor loops have widths (excursion lengths) of ΔT=7 C and 10 C respectively. Most of the minor loops in FIGS. 1A and 1B are hysteretic, with some of them being rather flat. Continuing to decrease excursion lengths ΔT, it was uncovered that for sufficiently small ΔT, all minor loops flattened out, degenerating into non-hysteretic branches. Although some minor loops may become flat even at ~10 C, as can be seen in FIG. 1B, practically the majority of them become flat at or below a threshold value ΔT*=4 C–5 C., as can be seen in FIGS. 2A and 2B.

For ΔT<ΔT* the minor loops become single-valued branches. These single-valued branches are linear in log(ρ) vs. T. The inventors call them non-hysteretic branches (NHBs). A NHB can be initiated from any attachment point on the major loop, either on a heating branch (HB) or on a cooling branch (CB). Another prominent feature of NHBs evident from the FIGS. 2A and 2B, is that most of them are linear in log(ρ) vs. T and have the TCR of the semiconducting phase or even higher. The limited exception to this rule, are the NHBs on a heating branch that are close to the high-temperature merging point T$_M$ (metallic phase end) of the major loop where NHBs have visibly lower TCRs. This behavior and the physical reasons for it will be discussed below.

Two NHBs, one for a PLD and another for a POP sample are shown on an expanded scale in FIG. 3. The straight lines represent linear fits to the data, showing TCR values of −3.96% and −2.90% respectively.

Examination of FIGS. 2A and 2B indicates that, except for the region close to the high-temperature merging point of the major loop $T_M \approx 90$ C, all NHBs exhibit similar slopes on the $\log(\rho)$ vs. T plot, or similar $TCR = d[\ln \rho/dT] = (1/\rho)d\rho/dT = 2.303\, d[\log \rho]/dT$, and that these slopes are also similar to the slope in the pure semiconductor (S) phase below the phase transition. This similarity, points to the underlying cause of semiconducting behavior in NHBs being the electrical conduction through the percolating semiconducting phase, as will be discussed in more detail below.

Figure 4:
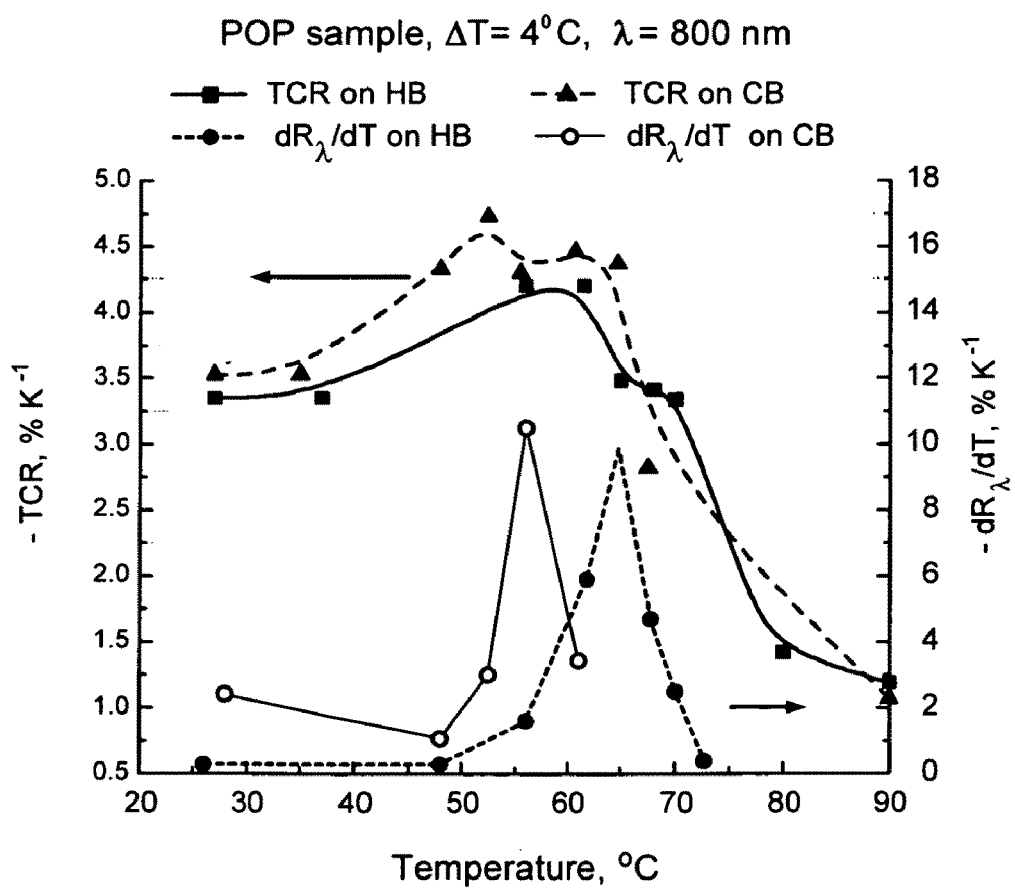
FIG. 4 is a chart illustrating temperature coefficient of resistance (TCR) and optical reflectivity slopes of various NHBs of POP sample.

Examining NHB behavior around the major loop in more detail, the actual TCRs obtained by fitting NHBs of a POP sample of FIG. 2A are plotted vs. $T_0$ in FIG. 4 for both HB and CB. Currently TCRs are being discussed; the optical reflectivity slopes plotted on the same figure will be discussed later.

It is noted that TCRs in S-phase at 25 C in the POP sample is 3.5%, which is considerably higher than typical $TCR \approx 2\%$ at 25 C found in the prior art on $VO_x$. This is in fact, higher than most TCRs reported in the prior art for un-doped $VO_2$ films. This can be attributed to the fact that the POP samples are composed of an essentially pure $VO_2$ phase.

Looking at TCR values in NHBs as a function of $T_0$, non-monotonic behavior is observed with a maximum. The highest TCR exceed the S-phase value significantly, reaching 4.73%. TCR drops when $T_0$ rises to within 15 C of the upper merging point of the major loop, $T_M$.

NHBs and their TCRs remain stable and reproducible after multiple cycling. This includes repeated excursions back and forth about a mid-point of a given NHB, and global cycles over the whole major hysteresis loop. Starting at a given NM attachment temperature, a global trip over the entire major loop can be effected, but once the temperature returns to the same attachment point $T_0$, a small backward excursion will be tracing an NHB with the same TCR as before the global trip.

The resistive NHB properties can be summarized as follows: NHB can be initiated from any attachment temperature $T_0$ on a major loop; NHB is reproducible upon repeated back-and-forth temperature excursions and upon returning to the same attachment temperature after a global excursion; NHB is linear in $\log(\rho)$ vs. T; and TCR vs. $T_0$ in various NHBs exhibit a peak, with the highest TCR values exceeding the S-phase 25 C value by as much as 40%. All TCR values fall off when $T_0$ approaches $T_M$.

Optical data will be briefly discussed here as it is relevant to the physical interpretation of NHB phenomenon and as it additionally provides guidance in locating resistive TCRs with the highest values. In addition to hysteretic transition in resistivity, the SMT leads to hysteretic optical reflectivity. Optical reflectivity measured as a function of temperature at a fixed wavelength $\lambda$, $R_\lambda(T)$, exhibits similar behavior to resistivity in that short backward round-trip excursions also produce optical non-hysteretic branches (optical NHBs). The detailed data on optical reflectivity as a function of T for a fixed wavelength of light is not shown here. However, in FIG. 4 slopes of optical NHBs, $dR_\lambda/dT$, are shown alongside resistive TCRs. As can be seen, the maxima in TCR and optical NHB slopes occur at essentially the same temperatures for both HB and CB data.

A qualitative explanation will be provided to the observed NHB phenomenon providing insight into both the non-hysteretic behavior and the fact that all NHBs have similar TCR that is essentially the S-phase TCR. The explanation will also explore the fact that optical NHBs have T-dependence as well, and that resistive TCRs and optical NHBs exhibit a peak at essentially the same temperatures.

The hysteretic region in $VO_2$ is a mixed state consisting of both the semiconductor (S) and the metallic (M) phase regions. Each such region located in a film around a point with spatial coordinates (x,y) transitions into the other phase at its own temperature $T_C(x,y)$ with an intrinsic hysteresis characterized by the coercive temperature $T^*(x,y)$. In a macroscopic sample these parameters are continuously distributed. Ignoring for the sake of simplicity the variation in $T^*$, it is assumed that the film is characterized by a local $T_C(x,y)$. At a given temperature T inside the hysteretic loop, some parts of the film have $T_C(x,y)<T$ and some $T_C(x,y)>T$. In the first approximation, the boundary wall between the S and M phases is determined by the condition $T_C(x,y)=T$. In this approximation, the wall is highly irregular and its ruggedness corresponds to the scale at which one can define the local $T_C(x,y)$. A refinement is needed that takes into account the boundary energy, associated with the phase domain wall itself. The boundary energy is positive and to minimize its contribution to the free energy the domain walls are relatively smooth.

As to the heating branch, when the temperature rises, the area of the M phase increases. Two metallic lakes that are about to merge will be now discussed.

Figure 5:
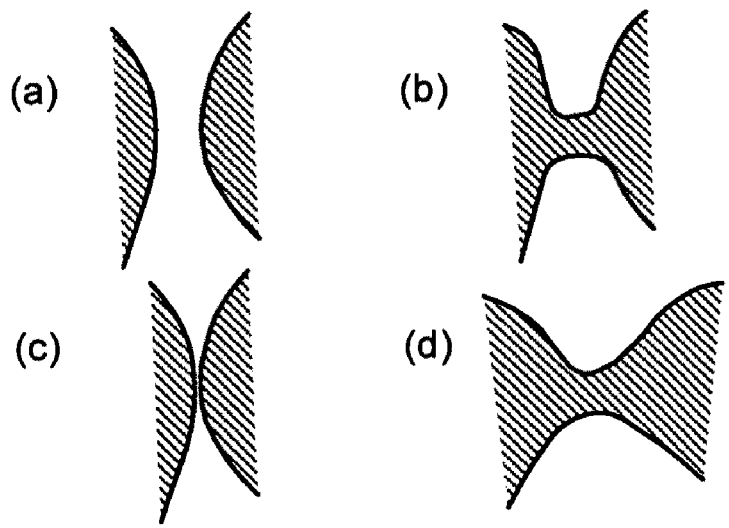
FIGS. 5A and 5B show a schematics of semiconductor-metal boundary which corresponds to temperature T$_1$.
FIGS. 5C and 5D show schematics of semiconductor-metal boundary which corresponds to temperature T$_2$>T$_1$.

Referring now to FIG. 5, showing semiconductor-metal boundary separating metallic and semiconducting phases. FIGS. 5a and 5b correspond to temperature $T_1$. FIGS. 5c and 5d correspond to temperature $T_2>T_1$. Since the boundary illustrated in FIG. 5 is smooth, at some temperature the distance between the lakes becomes smaller than the radius of curvature of either lake at the point they will eventually touch. In this situation simple geometric considerations show that at some $T=T_{cr}$ the following two configurations will have equal energies. The first configuration comprises two disconnected M phase lakes that are near touching. The other configuration is formed with a finite link formed between the two lakes, FIGS. 5a and 5b respectively. Both configurations are characterized by equal boundary lengths and therefore have equal free energy. In the thermodynamic sense, $T_{cr}$ can be addressed as the critical temperature for the link formation. The actual transition forming a local link, however, does not occur at that temperature because of an immense kinetic barrier between these two macroscopically different configurations. The transition occurs at a higher $T_0=T+\Delta T^*$ when it is actually forced, i.e. when the two phases touch at a point. The steep slopes of the major loop are associated with the quasi-continuous formation of such links, i.e. with local topological changes. On the FIB the steep slope is associated with the merger of metallic lakes; on the CB it is the linkage of semiconductor regions.

Consider now a small excursion backwards from $T_0$. As the temperature decreases, the last formed M-link does not disappear immediately for the same kinetic reason. One has two S regions that need to touch in order to wipe out the M-link. It takes a backward excursion of amplitude $\Delta T^*$ to establish an S-link and thus disconnect the last M-link. So long as we are within $\Delta T^*$, i.e. stay on the same NHB, the area of S and M domains changes continuously, but the topology is stable and no new links are formed. Within the range of that stable "frozen topology", the resistivity of NHB is predominantly controlled by the percolating semiconductor phase.

Figure 6:
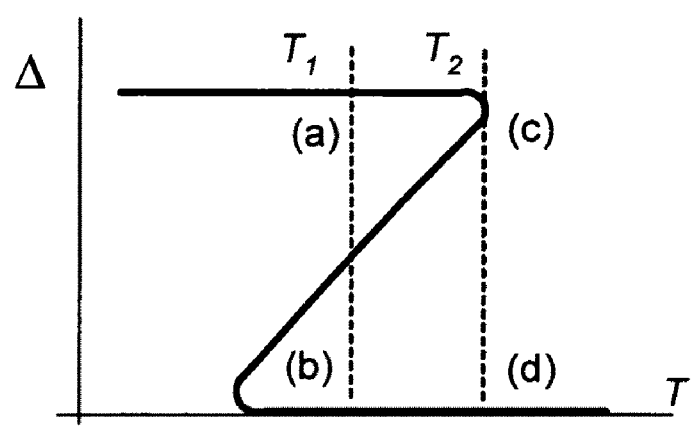
FIG. 6 is a chart illustrating order parameter characterizing the local transition in a certain region, including contribution of a boundary energy.

Referring now to FIG. 6 showing order parameter characterizing the local transition in a certain region, including contribution of the boundary energy. At temperature $T_1$ the two phases have equal energies. By definition, the local $T_C(x,y)=T_1$. The actual transition occurs at $T_2$ and corresponds to the formation of a finite link, as in FIG. 5*d*.

FIG. 6, further illustrates the local transition which depicts an order parameter $\Delta$ that characterizes the transition; $\Delta=0$ in the metallic phase and finite in the semiconductor phase. The points (a) to (d) correspond to the configurations in FIG. 5.

Upon slightly cooling of the sample, the local region will follow the lower branch of the curve, will pass point (b) and undergo transition at the leftmost knee. That transition corresponds to establishment of a link between the top and the bottom semiconductor phases, as illustrated in FIG. 5. The temperature range of the transitionless cooling corresponds to shrinkage of the metallic region without a local topological change. The described picture is the basis of the inventor's interpretation of the slopes in the hysteretic $\rho(T)$ loop, cf. experimental FIGS. 2A and 2B.

The slope (TCR) on the NHB may be somewhat higher than that of the semiconductor phase itself. This is because it includes not only the temperature variation of semiconductor resistivity but also the smooth change of geometry. Indeed, looking at FIG. 4 where TCRs and optical slopes $dR_\lambda/dT$ are plotted on the same graph. It can be observed that the peak in $dR_\lambda/dT$ takes place in the same temperature interval in which the peak in TCR is observed. Comparing different NHBs, higher values of $dR_\lambda/dT$ imply the higher rate of area re-distribution between the S- and M-phases within a NHB. Let $A_S$ and $A_M$ be the total areas of S-phase and M-phase in a sample, so that the total sample area is $A=A_S+A_M$. Clearly, as A does not depend on T, $dA_M/dT=-dA_S/dT$, i.e. the area of one phase grows at the expense of the other. The optical slope $dR_\lambda/dT$ is proportional to this area re-distribution rate, and the maximum in $dR_\lambda/dT$ reflects the maximum in $dA_M/dT$. This proportionality is true for the slopes on a major loop as well as for much smaller slopes we find in NHBs. When temperature is increasing, in all cases M-phase either grows or stays the same, $dA_M/dT \geq 0$; equal sign here corresponds to those NHBs with "frozen geometry". Increasing M-phase content promotes electrical conductivity (lowers resistivity), and therefore TCR in NHBs corresponding to non-zero $dR_\lambda/dT$ should be enhanced compared to the pure S-phase, and the maximum in $dR_\lambda/dT$ should correlate with the maximally enhanced TCR. FIG. 4 confirms this correlation for POP samples.

The percolation picture also helps to understand why $dR_\lambda/dT$ will exhibit such a maximum in the first place. With changing temperature, the boundary moves, each section of the boundary line advancing in the direction normal to this line at any given temperature. It is clear that the highest rate of change of the area of each phase will therefore occur when the boundary is the longest, i.e. at the percolation transition. Thus the observed peak in $dR_\lambda/dT$ occurs right at the percolation transition, allowing its detection. The considerations expressed above for a HB apply equally to a CB of the major loop.

In summary, it has been explained why there exists a threshold excursion length $\Delta T^*$ below which all minor loops become NHBs; in our samples $\Delta T^*=4-5$ C. As long as the S-phase forms a global cluster (and therefore the M-phase is disconnected), the S-phase TCR will be observed in the NHBs. A secondary but noticeable and beneficial effect is the increase of TCR values above the S-phase value due to re-distribution of S- and M-phase areas within an NHB. This effect is strongest when the boundary line between the phases is the longest, i.e. at the percolation transition. At higher temperatures, above the percolation transition, the M-phase percolates, shorting out the S-phase, and TCRs fall to low values.

Thus the higher values of $dR_\lambda/dT$ found in certain regions around the major hysteresis loop at the same time guide us to the regions where the highest values of TCR will be found. Inversely, the regions in which we find the absence of optical slope, $dR_\lambda/dT=0$, indicate "frozen" geometry of S- and M-phases and thus signal a condition of TCR being essentially equal to the TCR of the pure S-phase (with the exception of temperatures close to the merging temperature $T_M$ of the major loop).

The discovered NHB phenomenon can be beneficially employed in FPA applications. Thus, it is possible to utilize a good quality, single phase $VO_2$ material instead of a mixed oxide $VO_x$ to fabricate the pixilated bolometric sensor array or sensor matrix. The deposition process for $VO_2$ is compatible with the normal bolometer fabrication process: using POP good $VO_2$ was deposited at below 400 C. The sensor array should be set to operate within a NHB attached either to the HB or to the CB. The NHB will be chosen on the basis of its desired resistance, which can be adjusted in a wide range in order to be matched to the readout circuit amplifier. It will be also chosen to maximize TCR, which, as we have seen, may vary between different NHBs around the major loop, peaking at the percolation transition. The operating temperature $T_{OP}$ (i.e. the temperature at which the sensor array is stabilized awaiting the projected IR signal) can be chosen anywhere within a desired NHB: $T_0 - \Delta T^* < T_{OP} < T_0$ on the heating branch and within $T_0 < T_{OP} < T_0 + \Delta T^*$ on the cooling branch.

Two essential requirements for the correct operation of a sensor according to the present invention are as follows: (1) A sensor should operate so as to produce no memory effects, and (2) A sensor should operate so as to produce no minor hysteresis loops.

To satisfy the first requirement presented above, the operating point must be removed from $T_0$, as moving forward from $T_0$ will produce memory. In order to satisfy the second requirement, it should also be removed from $T_0 \pm \Delta T^*$ (here + refers to CB and – to HB). Once the sensor's temperature will deviate by more than $\Delta T^*$ from $T_0$, NHB will turn into a minor loop and thus the R(T) of a device will loose its single-valued character.

The dynamic range of a device can be defined as the range of T over which it is maintained within a NHB. One possible choice is to place $T_{OP}$ in the middle of an NHB. In this case, the dynamic range will be symmetrical around $T_{OP}$, allowing for equal amount of heating and cooling of a pixel (heating or cooling of a pixel is produced when a sensor is staring at a scene which is hotter or colder than a sensor, respectively). The maximum temperature change consistent with working within a given NHB in this case, is equal to a half of the total NHB width, or $\Delta T^*/2$. In the reviewed samples, this implies operating within approximately $\pm 2°$.

It may be however, beneficial to choose $T_{OP}$ closer to one or the other side of the dynamic range interval. For example, if an IR radiation projected onto a sensor warms it up above $T_{OP}$, for the NHB attached to the heating branch it may be beneficial to position $T_{OP}$ closer to $T_0 - \Delta T^*$, and for the NHB attached to the cooling branch, closer to $T_0$.

Situation now will be considered, what should happen if a device exceeds the dynamic range (in other words, if either the fixed $T_{OP}$ will inadvertently shift, or the projected IR picture will cause T to deviate to the outside of the dynamic range)? The result will depend on which side of the allowed interval is exceeded.

If the sensor will exceed $T_0$ (here the term "exceed" means "becomes greater than" on the heating branch and "becomes smaller than" on the cooling branch), it will change its resistance according to a much higher TCR on the major hysteresis loop at $T'_0$. The round trip temperature excursion exceeding $T_0$ will move the sensor to a different NHB attached to a different temperature point on the major loop $T'_0$ (on a heating branch $T'_0 > T_0$ and on a cooling branch $T'_0 < T_0$). Once in a new NHB, as long as the new $T'_0$ is not exceeded, the device will work essentially as before, provided that $T'_0 - T_0$ is small and therefore the new NHB has very similar TCR to the old NHB. In this sense, the device is expected to be resistant to such shifts changing NHB's attachment temperature as long as they are sufficiently small.

On the other side of the dynamic range interval, exceeding $T_0 \pm \Delta T^*$, the sensor will operate on a minor loop instead of NHB. It will not experience a high major-loop TCR and will not acquire different resistance from moving along the major loop as above. However, the double-valued nature of the minor loop is expected to make correct IR picture visualization difficult or distorted. If $T_0 \pm \Delta T^*$ is exceeded by a small amount, the minor loop will be rather flat, making such distortions less detrimental.

The procedures which have to be followed in order to set the sensor matrix in the correct operating regime according to the present invention, will be now described in detail.

Figure 7:
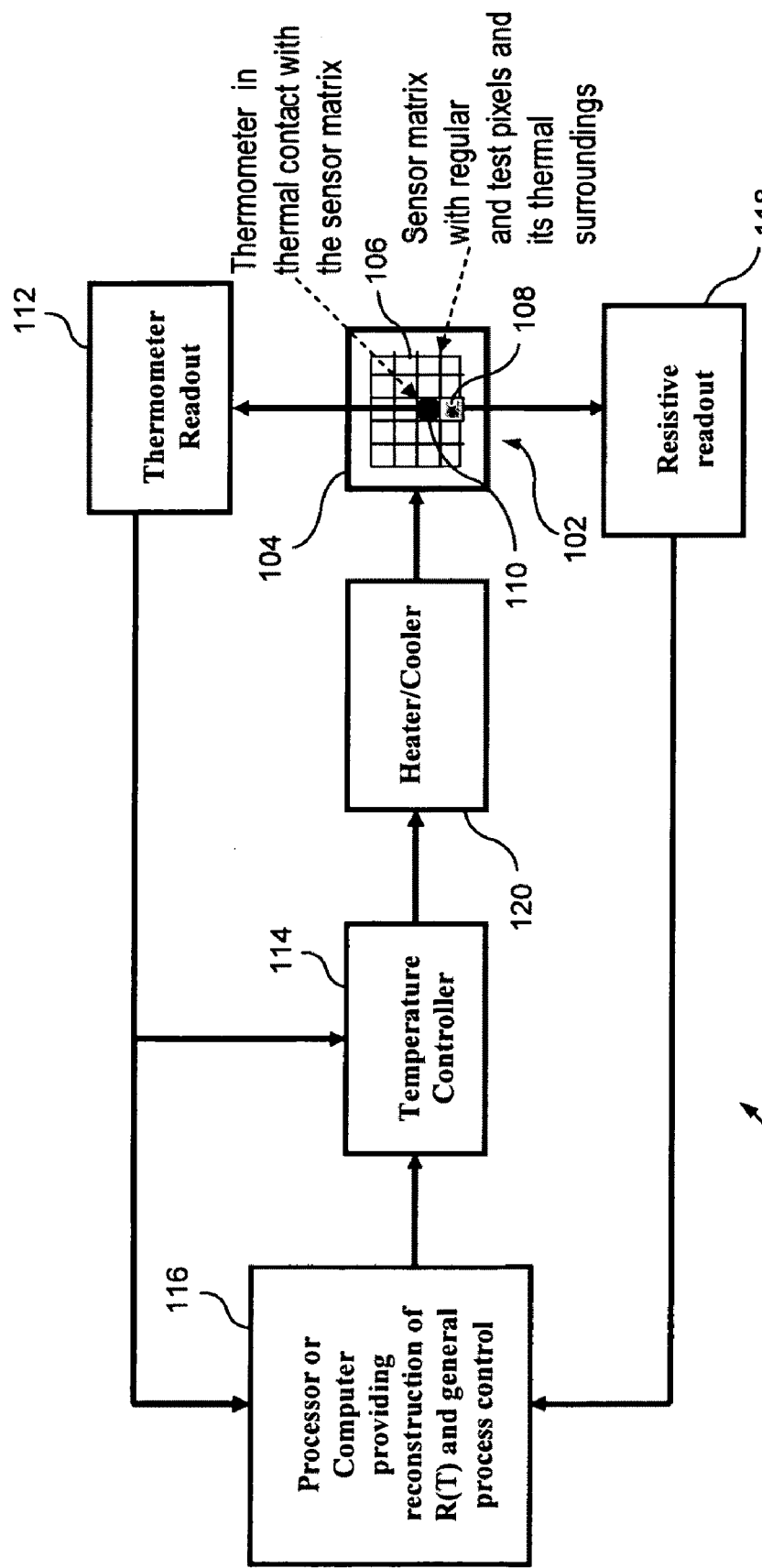
FIG. 7 is a schematic block diagram of one embodiment of an apparatus of the invention.

Referring now to FIG. 7 which is a schematic block diagram of an apparatus 100 adapted to perform various functions required for operation of the invention. A sensor matrix 102 encapsulated into a thermal enclosure 104, includes a plurality of regular pixels 106 with single or multiple test pixels 108 (shown in gradual shading), which are designated for measuring the resistance. It will be discussed below, that in order to measure the resistance as a function of temperature, the predetermined test pixel which is chosen for such measuring should accurately represent conditions/characteristics of the matrix. A thermometer or a temperature measuring device 110 is provided in thermal contact with the sensor in general and the designated test pixel in particular. A signal generated by the temperature measuring device 110 is directed to a temperature readout 112 which is in turn connected to a temperature controller 114. This signal is also directed to the processor or computer 116 which is programmed to control the whole process as will be described below. An embodiment where the temperature readout and temperature controller are implemented in one unit is also contemplated. A feed back function provided by this connection will be discussed below.

It is also illustrated in the diagram of FIG. 7 that from the test pixel or a plurality of test pixels, a signal is also provided to a resistive readout 118. The resistive readout may comprise a system providing constant current to a test pixel and measuring voltage drop across the pixel, resistance being the ratio of said voltage to the said current, or it may operate in any number of ways in which resistance is known to be measured in the art.

The processor or computer 116 is provided, so as to function as a means of assembling together the readings from the resistive readout and from the temperature readout. In this manner, the computer 116 is capable of reconstructing resistance as a function of temperature R(T), and to further control the whole process according to the obtained R(T). The processor or computer 116 is programmed for controlling the setting and maintaining the operating temperature of the sensor matrix 102 and its immediate thermal surroundings, such control being directed by the said R(T). The process control is exercised substantially by controlling the temperature of the sensor matrix 102 and its immediate thermal surroundings. In order to exercise such process control, the processor or computer 116 is connected to a temperature controller 114. It should be noted however, that the temperature controller itself can be in the form of a programmable device. In such instance, there is no need for a separate computer adapted to carry out this function. In this case all of the functions of the processor or computer 116 and the temperature controller 114 may be combined in a single unit.

An arrangement or means for changing temperature 120 is provided and can be in the form of an electric cooler/heater adapted for controlling the heating or cooling function. It will be discussed below that the temperature control arrangement is provided for maintaining an operational temperature not only for the sensor itself, but also to all immediate surroundings of the sensor. For example, a thermo-electric cooler, which is a reversible thermal device capable of providing either heating or cooling function, can be utilized.

The means of temperature control will have to be sufficient to perform these tasks. The temperature $T_{OP}$ would have to be fixed and maintained with some precision during the operation of a device. The stability of $T_{OP}$ required in the present invention should be similar to the stability required in the prior art UFPA technology operating at or around 25° C., as the present invention is dealing with linear NHB similar to the S-phase at 25 C. However, additionally the means of temperature control and means of R(T) measurements will have to be such as to maintain a similar precision over a much wider temperature range than in existing technology.

Based on the measured R(T), the processor or computer 116 is adapted to control the temperature controller 114, which in turn controls the arrangement for changing a temperature or heater/cooler 120, thus providing a desired temperature profile as a function of time. In this manner, the actual censor can be provided with either constant or variable temperature.

The required feedback function is provided through a connection between the thermometer readout or temperature reading arrangement 112 and the temperature controller 114. The same signal is also supplied to the processor or a computer 116. As indicated above, the two functions can be combined in one. A signal generated by the thermometer 110 which measures temperature of the test pixel, is directed back to temperature controller 114 and to the processor or computer 116. The processor/computer, based on this information, provides an input causing the temperature to be adjusted according to its program, either raised, or lowered. It also provides control of the rate at which temperature is raised or lowered, so as to avoid overshooting of the desired temperature levels. In this manner, the feedback function is accomplished.

In an alternate embodiment, a temperature reading function carried out by the thermometer readout can be accomplished by a portion of the temperature controller arrangement. In such instance, there is no need to provide a separate thermometer readout device.

Referring now to diagrams of FIGS. 8A, 8B, 9A and 9B, illustrating a method of setting a sensor at the desired operating point or a method of positioning a sensor at the desired operating point of the invention. Because of the hysteretic nature of the sensor material, setting the correct operational temperature range is an essential aspect of the invention. This is the reason why distinctive heating and cooling steps are exercised in the invention. In order to function according to the present invention, the sensor should be placed in the proper working regime in one of the NHBs. Because of the hysteretic nature of the phase transition, this requires specific steps which depend on the location of the NHB on the major hysteresis loop.

Referring now to FIGS. 8A and 8B which illustrate how a sensor temperature should be set up at the operating temperature on a heating branch (HB) of the major hysteresis loop. The figures show a sensor initially before the system is turned on, at some ambient temperature $T_A$ (for example, at room temperature). Starting from this initial point $T_A$, the sensor is eventually positioned at a desired operating temperature $T_{OP}$ when it is operating on a heating branch (HB) of the major loop, with the NHB attachment temperature $T_0$. The operating temperature $T_{OP}$ is chosen between the limits (endpoints) of a given NHB of total temperature width $\Delta T^*$, which on a HB means $T_0 - \Delta T^* < T_{OP} < T_0$. If the operating temperature is chosen in the middle of NHB, than $T_{OP} = T_0 - \Delta T^*/2$.

FIG. 8A shows the sensor temperature T as a function of time t (the thermal history, or T(t)), while FIG. 8B shows corresponding sensor resistance R as a function of temperature T (i.e. it traces sensor resistance as it is changing along the actual R(T) curve corresponding to T(t) of FIG. 8A.).

Figure 11A:
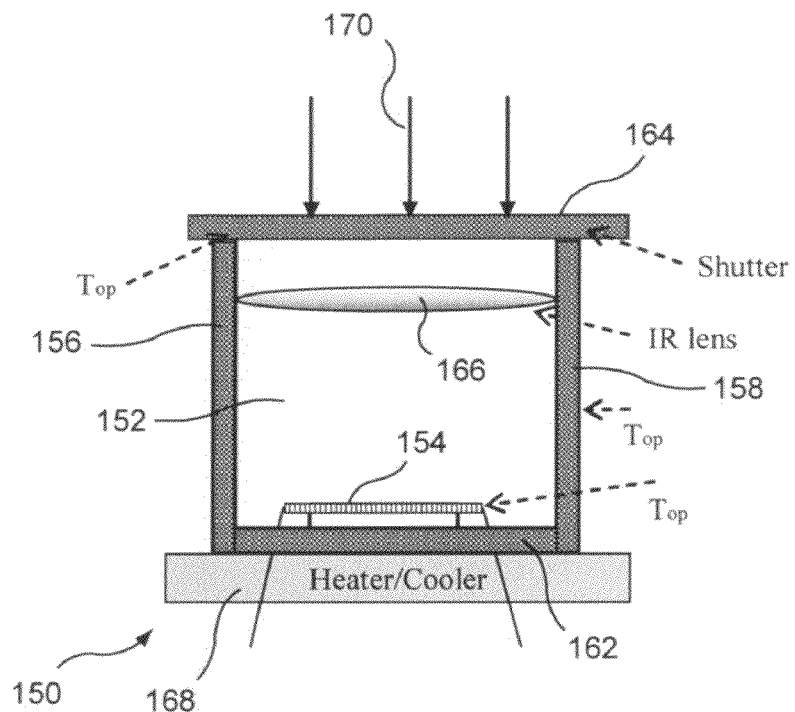
FIG. 11A illustrates one embodiment of the apparatus of the invention with an optional shutter being closed.
Figure 11B:
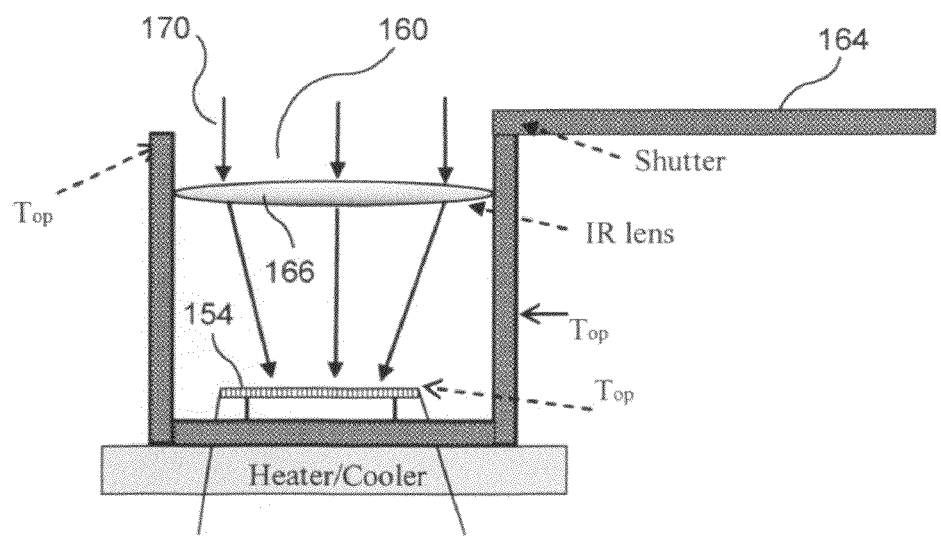
FIG. 11B illustrates the apparatus of FIG. 11A with the shutter being opened.

Specific way in which the temperature approaches points $T_0$ and $T_{OP}$ is not essential, except for the requirement that in temperature intervals from $T_A$ to $T_0$ and from $T_0$ to $T_{OP}$, the temperature increases and decreases in a monotonous way, and that the desired temperatures $T_0$ and $T_{OP}$ should be approached sufficiently slowly. In this manner the system temperature does not rise or fall above or below these temperatures, does not "overshoot". Because of the hysteresis, such overshooting, if significant, will be difficult to correct. If significant overshooting occurs, starting the whole process from the beginning may be required. The process of reaching $T_{OP}$ according to FIGS. 8A and 8B will be governed by computer or processor or by a programmable temperature controller similar to that discussed above. This thermal path setting the sensor at the desired $T_{OP}$ may be followed not only by the sensor matrix, but by all of the immediate sensor surroundings thermally interacting with the sensor. The sensor matrix is in an approximate thermal equilibrium with such surroundings, which may include but not limited to: a heater/cooler, a substrate on which a sensor matrix rests, walls of the chamber housing the sensor, shutter or a diaphragm separating the sensor chamber from the outside, infrared optics, etc. Such sensor surroundings are shown in FIG. 11A. This sensor thermal equilibrium with its immediate surroundings is intentionally violated only during the periods of sensor exposure to the IR signal from the outside scene, as shown in FIG. 11B, which shows the shutter being opened and the sensor matrix being exposed to an IR signal. As the sensor chamber may be evacuated from air, there may be another IR-transparent partition or a wall not shown in FIG. 11B which maintains the integrity of the vacuum system, as is practiced in prior art.

The thermal path shown in FIGS. 8A and 8B should be followed only once, at the beginning of sensor's operation (or at the beginning of a new cycle of its operation). After that, as long the sensor is operating within a given NHB, this process does not have to be repeated.

Figure 9A:
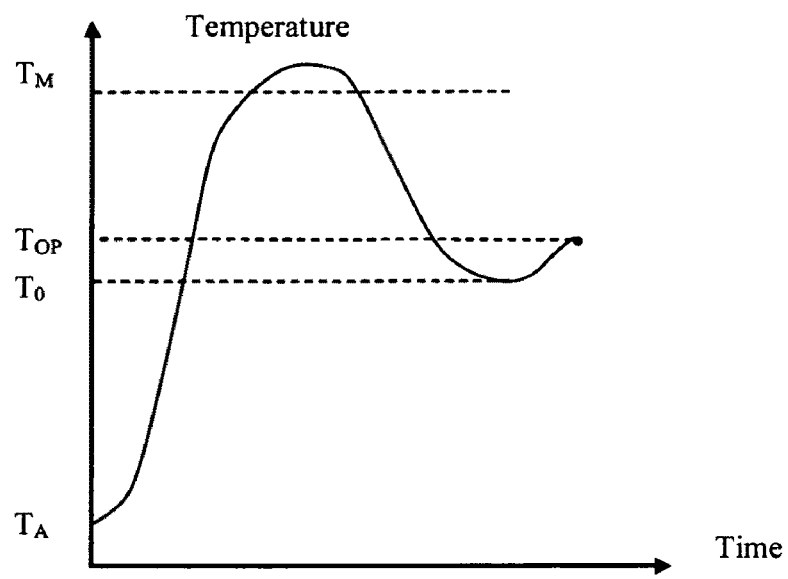
FIGS. 9A and 9B are further diagrams illustrating a method of positioning sensor at the desired operating point of the invention.
Figure 9B:
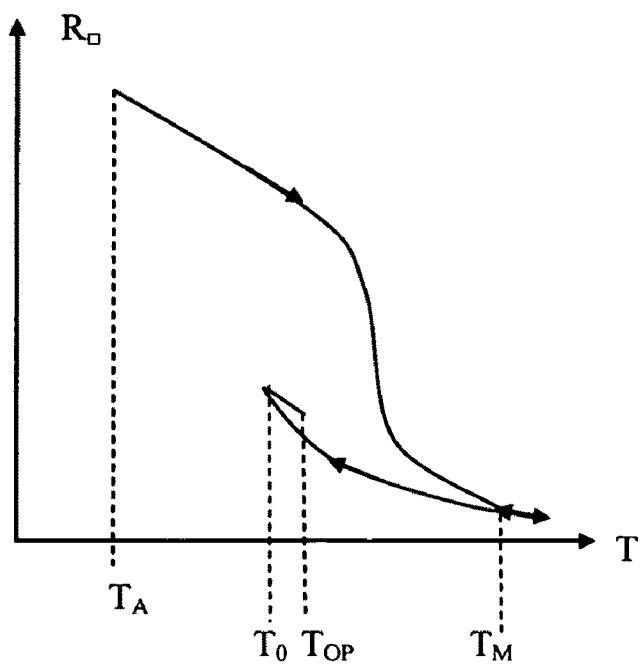

Referring now to FIGS. 9A and 9B which illustrate how a sensor, initially at some ambient temperature $T_A$, is positioned at a desired operating temperature $T_{OP}$ when it is operating on a cooling branch (CB) of the major loop, with the NHB attachment temperature $T_0$. In this case, the sensor and the respective surroundings have to be first heated above the upper merging point of the major loop $T_M$ and then cooled to the desired $T_0$ on a CB. After that the sensor including the surroundings are heated to $T_{OP}$ which is within NHB limits: $T_0 < T_{OP} < T_0 + \Delta T^*$. If the operating temperature is chosen in the middle of NHB, than $T_{OP} = T_0 + */2$.

As before, in FIG. 9A, the precise way in which the temperature changes as a function of time is not important. However, it must change in a way allowing setting the desired operating temperature correctly, which implies that monotonous parts of the curves lie between temperatures $T_A$ and $T_M$, $T_M$ and $T_0$, $T_0$ and $T_{OP}$, and that temperature overshooting is avoided.

A preferred region for the operating temperature is on the cooling branch of the major hysteretic loop. This is because, it has lower operating temperatures and because some of highest TCR's are also found on the cooling branch. Again in the invention, in view of the hysteretic nature of the system, transferring from ambient temperature $T_A$ to the desired temperature $T_{OP}$ on the CB requires following of a specific thermal path. This specific path requires reaching or exceeding the upper merging point of the major hysteresis loop (the minimal requirement is that of reaching $T_M$; slight overshooting of $T_M$ can be executed to guarantee that it has been fully reached; this overshooting has no detrimental effect on the process of setting $T_{OP}$). Significant overshooting of $T_M$ is unnecessary. Furthermore, since the sensors based on $VO_2$ are not very stable at high temperature, the significant overshooting of $T_M$ is not only unnecessary but also undesirable, as it may produce some damage to a sensor. Exceeding $T_M$ by 1-5 C should be sufficient and safe. Once the $T_M$ is reached or slightly exceeded, temperature is reduced and the cooling branch is eventually reached, as shown in FIG. 9B. The temperature is lowered until it reaches the desired $T_0$ on a cooling branch. Once the desired $T_0$ on the CB is reached, the temperature starts to go up again, as illustrated in FIGS. 9A and 9B. When the temperature goes up at this point, the R(T) point is moving down on the non hysteretic branch, finally reaching the desired $R(T_{OP})$ inside the desired NHB.

The above-discussed examples are provided to illustrate placing the sensor matrix and their immediate surroundings at the desired operating point of a system. An essential feature of the invention is to define means and location for measurement of the resistance as a function of the temperature, which in turn serves as a "map" for the said process of setting the desired $T_{OP}$, as illustrated in FIGS. 8A, 8B, 9A, 9B, and FIG. 11A and FIG. 11B.

Since the sensor matrix is formed with multiplicity of separate pixels, in order to measure the resistance as a function of temperature, predetermined test pixels or test patches (which may have geometry and contact placement identical or different from regular pixels) have to be chosen for such measuring. Referring now to FIG. 10A showing a sensor matrix 132 encapsulated into a thermal enclosure 134. The matrix includes a plurality of regular pixels 136 (shown by hatch squares) with only four test pixels 138 (shown by shaded squares), which are designated for measuring the resistance. The test pixels 138 form a part of the sensor matrix itself. Although in the embodiment of FIG. 10A the matrix with four test pixels designated to measure such resistance are illustrated, in actuality any number of pixels can be designated as test pixels for the purpose of measuring resistance as a function of temperature. The test pixels should accurately represent characteristics of the matrix. When a sensor matrix is essentially uniform, measurements performed on a single test pixel or a test patch are sufficient to represent the behavior of the whole matrix. When the matrix is somewhat non-uniform in terms of pixel properties, R(T) for different pixels may not be identical. In this case, measurements on a plurality of test pixels or patches may be required, and additional measures may have to be taken to position the sensor matrix at the optimum regime of operation. For example, the user (through the programmed computer/controller) may choose some average values of $T_M$, $T_0$, $T_{OP}$ which best serve the given sensor matrix. As well indicated below, small non-uniformities should not be detrimental for the operation of a sensor according to the present invention, as neighboring NHBs are essentially similar to each other.

In the embodiment of FIG. 10A, the four test pixels 138 are uniformly/randomly disposed within the multiplicity of their regular counterparts. It should be noted however, that actual location of the test pixels is not very important as long as their positioning provides accurate representation of the conditions within the sensor matrix. As illustrated in the embodiment of FIG. 10B, there are no test pixels provided within the body of the matrix formed with the plurality of regular pixels 136. In this embodiment the test pixels 135, 137 are disposed at the periphery of the matrix, so as to be bound by the thermal surroundings 134. FIG. 10B illustrates three test pixels 135 with two contacts and one test pixel 137 having four contacts, so as to accommodate various approaches in measuring the resistivity, for example, two-contact methods and four-contact (four-probe) methods. The latter approach allows for the exclusion of contact resistance, which generally provides for a more accurate measure of R(T).

Preferably, the reference pixels or film patches should not be thermally isolated from the substrate. In fact, such isolation is considered to be detrimental for the measurement of R(T), as it may produce undesirable heating in the test pixel or patch during its measurement. For temperature measurement the conventional thermometers such as thermocouples, or semiconductor thermometers, or thin-film versions of such thermometers can be utilized.

If resistivity $\rho(T)$ is desired, it can be found from R(T) knowing the geometry of the rectangular-shaped film patch being measured, according to the formula $\rho=Rwt/L$. In this formula, L is the distance between voltage leads in the direction of the current flow, w is the width of a film perpendicular to the current flow, and t is its thickness.

Although, specific locations of the test pixels have been discussed hereinabove, it should be obvious to a person of reasonable skills in the present art that any reasonable variations of such locations are within the scope of the invention.

It should be noted, that all or part of the regular pixels may simultaneously serve as test pixels: test pixels may not differ from the regular pixels, and may serve a dual function, or they may differ only in terms of their thermal isolation from the substrate. The computer/controller may be programmed to find R(T) of any pixel within the sensor matrix. This is applicable to specially designated test pixel or patch or a regular pixel. The whole plurality of pixels in the matrix may be used for determining R(T), with the results of R(T) measurements being averaged over all pixels or a subset of all pixels.

When producing very uniform and reproducible sensor matrices will become possible so all sensor matrices behave in a predictable and reliable way, then some of the operations described above might be unnecessary. In this case, being sure of the "map" R(T) without a need to measure it in every sensor matrix, the user may program the computer/controller to reach the desired $T_{OP}$ by directly following the temperature paths T(t) of FIGS. 8a and 9a for the HB and the CB respectively, without a need to measure R. This will simplify the block diagram of FIG. 7, since removing from it the means of measuring R will be possible. However, the need to follow specific thermal paths will remain.

Referring now to FIGS. 11A and 11B, illustrating one embodiment of the apparatus of the invention 150, which is provided with a chamber 152 adapted to accommodate a sensor matrix 154 within an interior thereof. Side walls 156, 158 extending upwardly from a bottom wall 162 and form an inlet area 160 of the chamber. An optional shutter 164 can be provided for opening or closing the inlet area of the chamber when required. In the embodiment of FIGS. 11A and 11B, the sensor matrix 154 is positioned at and spaced from the bottom wall 162 or from a substrate. This spacing signifies microbridges, i.e. it signifies the need to have small thermal conduction between the sensor and the substrate, in order for the sensor to react with high sensitivity to the incident IR signal. Further, air should be evacuated from the chamber 152 in order to reduce or eliminate thermal conduction through air between the sensor and the surroundings. An infrared lens 166 is provided in the interior of the chamber between the sensor 154 and the inlet area 160. The lens can be also placed outside of the immediate thermal surroundings of a sensor matrix. The arrangement or means 168 for changing a temperature, such as for example an electric heater or cooler, is provided in the vicinity of the bottom wall (or a sensor matrix substrate). In an alternate embodiment, such arrangement can be arranged to essentially surround the sensor chamber. In still another embodiment, the arrangement or means for changing temperature can be provided at any other location and is connected to the sensor chamber by a sufficiently high thermal conductivity connection, so as to provide efficient heat transfer between the heater/cooler and the sensor chamber.

Prior to opening of the shatter 164, a thermal equilibrium is maintained and all areas of the chamber interior are kept at a substantially similar temperature. Such thermal equilibrium affects not only the sensor, but practically all surroundings of the sensor 154 within the chamber 152. This thermal equilibrium can be also understood as dynamic equilibrium, in which case there could be some temperature gradients between different parts of the system.

The infrared lens 166 is exposed to outside infrared signals/radiation emanating from a target or an observed object. Upon opening of the shutter 164, the interior of the chamber is exposed to an outside scene projected or focused onto a sensor matrix 154 by the infrared lens 166. In FIGS. 11A and 11B the infrared signals are represented by the arrows 170. The arrows converge toward the matrix 154, depicting the incoming infrared signals being focused by the lens onto the sensors matrix. Actually, by means of the lens 166, a picture of the object is focused on the matrix generating an IR image of the observed object. At this point, thermal equilibrium (or the dynamic thermal equilibrium) is broken and the pixels of the sensor are warmed or cooled down according to this picture. A given pixel exposed to a part of the focused picture of the outside scene which is hotter than $T_{OP}$ will heat up, while a pixel which happened to be exposed to a part of the focused picture of the outside scene which is colder than $T_{OP}$ will cool down.

As to the sensor 154, which is operating in a certain regime, as the shutter 164 opens or by any other means the images are projected on the sensor, various pixels acquire different temperatures and, as a result, different values of R(T) within a given NHB. Through electrical contacts to each pixel, this distribution of R values among different pixels is read out and eventually transformed into a visual picture. Thus ultimately, the infrared signals directed from the observed object are transferred into visual picture images on the screen, or otherwise recorded or reproduced in a non-IR domain suitable for the end user. The system of reading out of the electrical signals from all of the pixels of the sensor matrix is well-known in the art.

Does the narrow dynamic range of a few degrees (e.g. ±2 C if $T_{OP}$ is chosen in the middle of an NHB) present a problem in IR visualization?

There are two sources of a temperature change in a pixel: exposure to a scene which is integrated by a pixel for a ms-scale exposure times, and pulsed readout which sends voltage pulses to the pixels and reads out current, the latter reflecting pixel resistance and its changes under the IR radiation exposure.

The temperature change from scene exposure does not appear to be large, at least for the moderate intra-scene dynamic range (range of scene temperatures that has to be handled by the IR camera). In prior art, the following numbers were used to estimate these changes: in a microbolometer having a thermal isolation of $1\times10^7$ K/W and thermal capacity $10^{-9}$ J/K (which corresponds to a typical thermal time constant of 10 ms) an incident IR signal of 10 nW produces temperature change of 0.1 K.

It can be also noted, that faster frame rates (rates above 30 Hz), which are desirable in present-day UFPA technology, imply shorter integration times and thus will produce smaller $\Delta T$ excursions.

The second reason for a pixel temperature change (in this case, solely an increase) may come from pulsed readout (either current-biased or voltage biased, with voltage bias apparently preferred by the UFPA technology). The estimates of the signal-to-noise ratio (SNR) presented in a Table in FIG. 12 show that the pulsed voltage amplitude can be significantly lowered as compared to 5 V amplitude of the prior art, thus reducing pulsed heating.

This problem may be avoided altogether in an alternative approach that requires no excursions from the operating temperature at all. Prior art discusses the heat balancing design in which an electro-thermal feedback cycle is used to maintain the resistance and thus the temperature at a constant value. Instead of directly detecting the temperature change by measuring changes in resistance, prior art proposes electric power to be delivered to each detector pixel in such a way as to balance the heat absorbed from the target, maintaining a constant resistance and thus constant temperature. As incoming radiation increases, the power needed to maintain a constant temperature decreases. The measure of said power difference provides information about heat input into the microbolometer from the scene. In the prior art, this approach was designed to avoid individual array calibration, but it also appears very well suited for the NHB regime as proposed in the present invention.

As was discussed in the background section, one of the reasons why the high $R_\square$ films are detrimental to the FPA performance is the increase in Johnson's noise. However, increasing $R_\square$ also increases the useful electrical signal. Therefore, the more meaningful figure of merit to consider is the signal-to-noise ratio (SNR). Consider SNR values which are predicted by formula (1) for the POP sample studied by the inventors. This sample will serve as an example of an improvement in SNR values which can be achieved with the present invention.

Assuming that the prevailing noise source is Johnson's noise, formula (1) for SNR was derived above. It can be expressed as a product of a T-dependent prefactor $C(T)=V_0 \Delta T/(4kT\Delta f)^{1/2}$, TCR and $R_\square^{-1/2}$:

$$\text{SNR} = |\Delta I|/\delta I = C(T)(TCR)/R_\square^{1/2} \quad (2)$$

First, checking this formula for its consistency with the prior art: the numbers used in the prior art were: bias voltage $V_0=5$ V, $\Delta T=0.01$ K, measurement time of 70 μs corresponding to noise bandwidth of $\frac{1}{140}$ μs=7.1 kHz, temperature T=25 C=298 K. With typical $VO_x$ TCR=0.02 and $R_\square=50$ kΩ, the value of SNR obtained in prior art was SNR=416. With the same parameters, using formula (2), the value of the prefactor becomes $C(298K)=4.63\times10^6$ KΩ$^{1/2}$ and formula (2) predicts the same SNR=416 as in the prior art.

Referring now to Table of FIG. 12 containing data related to measured parameters and calculated SNR for a POP sample, d=220 nm. In Table of FIG. 12, the parameters and results of calculations relate to POP film previously discussed with reference to FIG. 1A and FIG. 2A. The calculations were conducted for the film in a semiconducting phase below the transition at 25 C and for several NHBs, taking operating temperatures in the middle of NHBs. Accounting for the difference in our POP film's thickness d=220 nm and the 50 nm thickness typically used in FPA applications, the values of Ro at 25 C and in the middle of NHBs were recalculated as $R_\square=(R_\square)_{MEASURED}\times220/50=(R_\square)_{MEASURED}\times4.4$.

In Table of FIG. 12, the first row corresponds to film in an S-phase at T=25 C=298 K. Keeping the same parameters as in the prior art in the prefactor C(T) in (2), with TCR=0.0352 and resistance $R_\square=3.5$ MΩ (the latter corresponding to $R_\square$ in a 50 nm pixel), SNR=87, which, despite a higher TCR, is lower than SNR=416 of the prior art. This illustrates that resistive $VO_2$ films are less favorable in terms of SNR than $VO_x$ films when used at room temperature.

Demonstrating a significant advantage of the present invention, substantially higher SNR was uncovered in various NHBs, reaching in some cases values well over 1000, as can be seen in Table of FIG. 12. SNR is particularly high in NHBs with low $R_\square$. A part of this very high SNR may be sacrificed in favor of lowering $V_0$, thus decreasing pixel heating during measurement, and/or in favor of shortening the measurement time (increasing $\Delta f$).

In the invention, an FPA matrix can be fabricated according to the existing technology, except for the sensor material. Instead of a mixed $VO_x$ oxide, the sensor material should be good quality $VO_2$ which exhibits ρ from about 0.1 Ωm to 1.0 Ωm in the semiconducting phase at room temperature, i.e. it will have $R_\square=2-20$ MΩ at 25° C. for a 50 nm film (utilizing material with room temperature $R_\square$ outside of this range does not violate the present invention). This $VO_2$ material should have a pronounced phase transition similar to the ones depicted in FIGS. 1A, 1B, 2A, and 2B.

In addition to a sensor containing pure $VO_2$, it is contemplated to use an appropriately doped $VO_2$ (having the following chemical formula, $V_{1-y}X_yO_2$ or $VO_{2-y}X_y$, depending on which element, V or O the dopant X substitutes). As to $VO_2$ doping, the guiding principle is choosing an appropriate dopant element or a combination of elements X. The optimum doping level (see y in the chemical formulas above) of the sensor is based on whichever additional benefits such doping may provide (see below), while maintaining the pronounced semiconductor-to-metal phase transition as required by the present invention. One of the advantages offered by such doping includes a significant reduction of the phase transition temperature $T_C$. In a film this means that the major hysteresis loop shifts to lower temperatures, and in the context of the present invention this implies that utilization of a NHB with a significantly lower operating temperature $T_{OP}$ is possible. For example, doping $VO_2$ with tungsten W produces reduction of $T_C$ at a rate of 24° C. per atomic % W. A similar effect can be achieved with doping $VO_2$ with some other elements, such as Nb, Mo, Re, Fe. Another beneficial effect of such doping may be in S-phase TCR increase. If TCR increases at room temperature, TCR in NHBs will also increase in such a doped film. However, simultaneously with these beneficial effects, doping tends to have detrimental effects on the phase transition strength in $VO_2$, which may render doped films inferior or unusable in the context of the present invention. Indeed, the general washing-out of the phase transition and reduction of the range of available resistivities between $\rho_m$ and $\rho_s$ which tends to accompany $VO_2$ doping may make the choice of a NHB with high_TCR and low resistivity more difficult or impossible. Interplay of the beneficial and detrimental effects of doping would have to be considered and optimized in view of specific sensor application in FPA technology. According to the invention, pure phase $VO_2$, implies and includes an appropriately doped $VO_2$ as well.

Figure 3A:
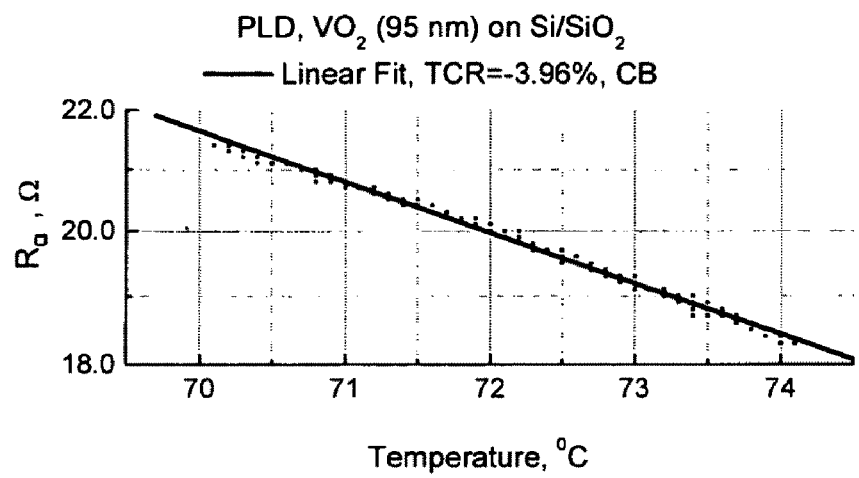
FIG. 3A is a chart illustrating a non-hysteretic branch (NHB) of POP sample, shown on an expanded scale.
Figure 3B:
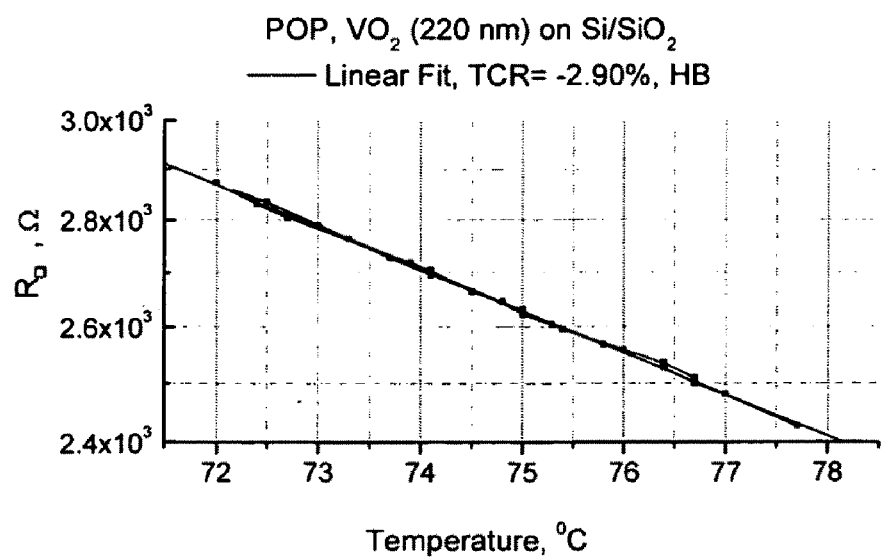
FIG. 3B is a chart illustrating a non-hysteretic branch (NHB) of PLD sample, shown on an expanded scale.

The IR visualization system is equipped with a temperature controller capable of changing and stabilizing temperatures in the interval from about room temperature to about 100° C. The temperature control will be sufficient to position and maintain the desired working temperature as described above. The sensor array is set at an operating temperature. An example of such temperature is as follows, $T_{OP}$=74.8° C., in the middle of a NHB attached to the heating branch of the major loop at approximately 77.7° C. (see FIG. 3B). Alternatively, the operating temperature can be chosen for example, $T_{OP}$=72.0° C., in the middle of a NHB attached to the cooling branch of the major loop at approximately 70° C. This is illustrated in FIG. 3A. However, it should be noted that the invention refers to two different samples depicted in FIG. 3A and in FIG. 3B.

In order to reach a NHB on a heating branch, the device is heated from room temperature to $T_0$=77.7° C., and then cool it from 77.7° C. to 74.8° C. In order to reach a NHB on the cooling branch, the device is warmed to above the upper limit of the hysteresis curve (i.e. approximately to 90°-95° C. for the sample in FIG. 2), then it is cooled down to $T_0$=70° C., and then warm it up to 72° C.

Once $T_{OP}$ has been set, each microbolometer pixel will operate in the range of temperatures in which it is remained within a single NHB. In this instance, NHB does not transform into a minor loop. In present examples, this means operation is provided in the interval of temperatures between 72° C. and 77.7° C. on the heating branch of a POP sample. As to FIG. 3B, the major loop and other data on this sample are not shown, only the NHB. The operation is actually conducted between 70° C. and 74° C. on a cooling branch of a PLD sample. In the interest of system stability, $T_{OP}$ can be chosen at a temperature in the middle of the available dynamic range. In the interest of increasing the dynamic range for heating, the temperature can be chosen to be closer to the lower temperature end of each interval.

It is noted that exposing a sensor to a projection of an IR picture from objects or parts of objects hotter than $T_{OP}$ will produce sensor heating above $T_{OP}$. In the same manner, exposure to projected pictures of objects or parts of objects which are cooler that $T_{OP}$ will produce sensor cooling below $T_{OP}$. In this sense the most versatile $T_{OP}$ will be in the middle of the dynamic range. However, when it is known that objects of interest are predominantly either cooler or hotter than $T_{OP}$, it may be beneficial to shift $T_{OP}$ accordingly.

The sensing layer will have TCR from ~2.5% to ~5% or even higher. It will be beneficial to have as high a TCR as possible. In this respect the higher TCR values found in NHBs as compared to TCR at 25° C. are beneficial. For example, as illustrated in FIG. 3A, TCR of 3.96% at $T_{op}$=72° C. in case of a cooling branch NHB. In this sample, S-phase TCR at 25° C. is 2.5%. The essential advantage offered by the present invention is that by utilizing an NHB near the lower part of the major hysteresis loop, it is possible to maintain resistivity orders of magnitude lower than at room temperature. The exact value of resistivity (and, therefore, $R_\square$) can be fine-tuned within the wide range of available values between $\rho_m$ and $\rho_s$. This is possible as long as TCR on a corresponding NHB stays sufficiently high. A region of resistivity values close to $T_M$, as was mentioned above, is excluded. Some of the representative numbers are found in Table of FIG. 12.

Given the wide range of available $R_\square$ values, if desirable, one can even operate with $R_\square$ which is considerably lower than $R_\square$~20 k$\Omega$, the latter being accepted as a standard in the existing $VO_x$-based technology.

We claim:

1. A bolometric sensor element, comprising:
a substantially thin film exhibiting metal-insulator transition qualities, an arrangement for controlling and regulating a temperature of said film, an arrangement for detecting a resistance of said film as a function of the regulated temperature, an arrangement for setting said resistance at a predetermined point within a main hysteretic loop of the metal-insulator transition, said predetermined point being inside of a region in which resistance versus temperature relationship of said film is essentially non-hysteretic, and an electronic readout arrangement for detecting variations of said resistance about said predetermined point in response to infrared irradiation.

2. A bolometric sensor element according to claim 1, wherein said predetermined point within the hysteretic loop is further chosen so as to match input impedance of said electronic readout arrangement.

3. A bolometric sensor element according to claim 1, wherein said readout arrangement generating a readout signal, said predetermined point within the hysteretic loop is further chosen so as to minimize the noise in the electronic readout signal.

4. A bolometric sensor element according to claim 1, wherein said predetermined point within the hysteretic loop is further chosen so as to minimize heating of a sensor element from the current passing through the bolometric element during electronic readout.

5. A bolometric sensor element according to claim 1, wherein said predetermined point within the main hysteretic loop is chosen so as to allow for a temperature range of non-hysteretic behavior to be at least 1° C. wide.

6. A bolometric sensor element according to claim 1, wherein said predetermined point within the hysteretic loop is further chosen so as to maximize the temperature coefficient of resistance (TCR) of said sensor bolometric element.

7. A bolometric sensor element, comprising:
a substantially thin film exhibiting metal-insulator transition qualities, an arrangement for controlling and regulating a temperature of said film, an arrangement for setting said temperature at a predetermined point within a main hysteretic loop of the metal-insulator transition, said predetermined temperature point being predetermined by a prior measurement of said sensor element or by a prior measurement of a different sensor element, and an electronic readout arrangement for detecting variations of sensor resistance about said point in response to infrared irradiation.

8. A bolometric sensor element according to claim 7, wherein said predetermined temperature point within the hysteretic loop is chosen so as to provide sensor resistance such as to match an input impedance of said electronic readout arrangement.

9. A bolometric sensor element according to claim 7, wherein said predetermined point within the hysteretic loop is further chosen so as to minimize the noise in the electronic readout signal.

10. A bolometric sensor element according to claim 7, wherein said predetermined point within the hysteretic loop is further chosen so as to minimize heating of said sensor element from a current passing through the bolometric element during electronic readout.

11. A bolometric sensor element according to claim 7, wherein said predetermined point within the main hysteretic loop is chosen so as to allow for a temperature range of non-hysteretic behavior to be at least 1° C. wide.

12. A bolometric sensor element according to claim 7, wherein said predetermined point within the hysteretic loop is further chosen so as to maximize the temperature coefficient of resistance (TCR) of said sensor bolometric element.

13. A bolometric sensor element according to claim 7, wherein said substantially thin film is made of vanadium dioxide.

14. A bolometric sensor element according to claim 7, wherein said predetermined point within the main hysteretic loop of the metal-insulator transition is chosen to be disposed on a non-hysteretic branch connected to a cooling branch of said main hysteretic loop.

15. A bolometric sensor element according to claim 7, wherein said predetermined point within the main hysteretic loop of the metal-insulator transition is chosen to be disposed on a non-hysteretic branch connected to a heating branch of said main hysteretic loop.

16. Infrared imaging array comprising: at least one bolometric element, said at least one bolometric element consisting of a substantially thin film exhibiting metal-insulator transition qualities, an arrangement for controlling and regulating a temperature of said film, means for detecting a resistance of said film as a function of the regulated temperature, an arrangement for setting said resistance at a predetermined point within main hysteretic loop of the metal-insulator transition, said predetermined point being inside a region in which resistance versus temperature ratio of said film is essentially single valued and non-hysteretic, and an electronic readout arrangement for detecting variations of said resistance about said predetermined point in response to infrared irradiation.

17. A bolometric system comprising:
a sensor matrix including a plurality of regular pixels and at least one test pixel designated for measuring resistance as a function of temperature;
a temperature measuring arrangement being in thermal contact with said at least one test pixel, a temperature readout associated with said temperature measuring arrangement, a resistive readout associated with said at least one test pixel;
an arrangement for combined reading of inputs from the resistive readout and the temperature readout, so as to reconstruct resistance as a function of temperature; and
a temperature control arrangement provided for maintaining an operational temperature of the sensor matrix and surrounding thereof;
whereby based on measuring resistance as a function of temperature said arrangement for combined readings is adapted to control a temperature controller which controls the temperature control arrangement, thus providing a desired temperature profile as a function of time.

18. The bolometric system according to claim 17, wherein a feedback function is provided through a connection between the temperature readout and the temperature control arrangement.

* * * * *